US012434234B2

(12) United States Patent
Kinney et al.

(10) Patent No.: US 12,434,234 B2
(45) Date of Patent: Oct. 7, 2025

(54) PIPETTE TIP EXTENSION, PIPETTE TIP, ASSEMBLY OF PIPETTE TIP AND PIPETTE TIP EXTENSION, AND METHOD OF USE

(71) Applicant: TECAN TRADING AG, Mannedorf (CH)

(72) Inventors: Patrick Kinney, Hayward, CA (US); Sujata Iyer, San Jose, CA (US); Philipp Ott, Steg (CH); Adrian Sager, Mannedorf (CH)

(73) Assignee: Tecan Trading AG, Mannedorf (CH)

( * ) Notice: Subject to any disclaimer, the term of this patent is extended or adjusted under 35 U.S.C. 154(b) by 964 days.

(21) Appl. No.: 17/295,194

(22) PCT Filed: Dec. 20, 2018

(86) PCT No.: PCT/US2018/066857
§ 371 (c)(1),
(2) Date: May 19, 2021

(87) PCT Pub. No.: WO2020/131072
PCT Pub. Date: Jun. 25, 2020

(65) Prior Publication Data

US 2022/0001376 A1 Jan. 6, 2022

(51) Int. Cl.

| | |
|---|---|
| ***B01L 1/00*** | (2006.01) |
| ***B01L 3/00*** | (2006.01) |
| ***B01L 3/02*** | (2006.01) |

(52) U.S. Cl.
CPC ........... *B01L 3/0275* (2013.01); *B01L 3/5635* (2013.01); *B01L 2200/025* (2013.01);
(Continued)

(58) Field of Classification Search
CPC ................ B01L 3/0275; B01L 3/5635; B01L 2200/025; B01L 2200/026;
(Continued)

(56) References Cited

U.S. PATENT DOCUMENTS 6,146,881 A * 11/2000 Hering .................. B01L 3/0275
435/284.1
6,290,863 B1 9/2001 Morgan
(Continued)

FOREIGN PATENT DOCUMENTS

CN 107863286 A 3/2018
DE 19742163 A1 4/1999
(Continued)

OTHER PUBLICATIONS

International Search Report and Written Opinion for corresponding PCT application No. PCT/US2018/066857, mailed Apr. 26, 2019.

*Primary Examiner* — Jill A Warden
*Assistant Examiner* — Michael Stanley Gzybowski
(74) *Attorney, Agent, or Firm* — Notaro, Michalos & Zaccaria P.C.

(57) ABSTRACT

A pipette tip extension having a proximal end, a distal end, and an exterior wall extending between the proximal end and the distal end is disclosed. The exterior wall has an outer side and an inner side and encloses an inner cavity which is delimited by the inner side of the exterior wall. The exterior wall forms at the proximal end a reception aperture. The pipette tip extension further has one or more distance elements arranged at the inner side of the exterior wall and protruding into the inner cavity.

17 Claims, 24 Drawing Sheets

(52) U.S. Cl.
CPC . *B01L 2200/026* (2013.01); *B01L 2200/0615* (2013.01); *B01L 2200/0689* (2013.01); *B01L 2300/0609* (2013.01); *B01L 2300/0858* (2013.01); *B01L 2400/049* (2013.01)

(58) Field of Classification Search
CPC ..... B01L 2200/0615; B01L 2200/0689; B01L 2300/0609; B01L 2300/0858; B01L 2400/049
See application file for complete search history.

(56) References Cited

U.S. PATENT DOCUMENTS

| | | | |
|---|---|---|---|
| 9,566,579 | B1 | 2/2017 | Kozlenko |
| 2015/0125942 | A1 | 5/2015 | Grier, Jr. |

FOREIGN PATENT DOCUMENTS

| | | | | | |
|---|---|---|---|---|---|
| EP | 1685901 | A1 | | 8/2006 | |
| EP | 1839752 | A2 | | 10/2007 | |
| EP | 2606977 | A1 | | 6/2013 | |
| WO | WO-2014140640 | A1 | * | 9/2014 | ............ B01L 3/0275 |
| WO | 2018/026886 | A1 | | 2/2018 | |

* cited by examiner

D - D

C - C

B - B

A - A

PIPETTE TIP EXTENSION, PIPETTE TIP, ASSEMBLY OF PIPETTE TIP AND PIPETTE TIP EXTENSION, AND METHOD OF USE

TECHNICAL FIELD OF THE INVENTION

The current invention relates to a pipette tip extension for interacting with areas of interest of biological samples, the pipette tip extension being attachable to a pipette tip. Furthermore, the invention relates to a pipette tip for interacting with areas of interest of biological samples, the pipette tip being combinable with a pipette tip extension, and an assembly interacting with areas of interest of biological samples, the assembly comprising a pipette tip and a pipette tip extension. Moreover, methods of using the aforementioned devices are provided.

DESCRIPTION OF THE RELATED ART

In order to provide a histopathological diagnosis, excised tissue is viewed under the microscope. With the advent of personalized medicine and the development of molecular techniques, these tissue sections may be further studied for the purpose of making therapeutic decisions and in some cases, specific areas of the tissue (so called AOI—area of interest) may be demarcated for analysis. For example, in the analysis of tumor samples with the aim to decide which drug or drug combination is best-suited in cancer therapy, there may be the need to isolate tumor cells from a mixture of tumor and normal cells and subsequently extract and purify nucleic acids, proteins or other subcellular elements and molecules from sections of frozen and formalin fixed paraffin embedded (FFPE) tumor tissue. Currently, tissue sections are collected by mechanically scraping the area of interest from the surface of a tissue slide or tissue block, or alternatively isolated from tissue sections using laser capture microdissection (LCM) and related techniques. The tissue sections will then undergo further steps—such as deparaffinization, cell lysis and a purification—using chemical and biochemical methods. For smaller AOIs, mechanical scraping using for example a sharp knife has typically a low spatial precision and in addition is susceptible to contamination of cells or molecules of the surrounding areas. LCM is useful for smaller regions but is expensive and non-conducive to clinical workflows.

SUMMARY OF THE INVENTION

It is an object of the present invention to provide an alternative device and an alternative method to specifically address and treat a locally restricted area of interest of a sample, in particular a biological sample, provided on a surface for example an area of interest of a tissue section on a microscope slide, or a locally restricted area of interest of a prepared sample, for example an area of interest of a tissue section embedded in paraffin, in an automated manner as a preparation for (a) subsequent analysis step(s).

This object is solved by a pipette tip extension which is attachable to a pipette tip. The pipette tip extension comprises a proximal end, a distal end, and an exterior wall extending between the proximal end and the distal end. The exterior wall has an outer side and an inner side and encloses an inner cavity which is delimited by the inner side of the exterior wall. The exterior wall forms at the proximal end a reception aperture for inserting a pipette tip. The exterior wall further forms at the distal end a dispense aperture. The pipette tip extension further comprises one or more distance elements which are arranged at the inner side of the exterior wall and which protrude into the inner cavity. The one or more distance elements are dimensioned to establish a fluid uptake are adjacent to the inner side of the exterior wall. The fluid uptake area extends from the dispense aperture up to the reception aperture. The fluid uptake area is in fluid connection with the surrounding atmosphere at the reception aperture.

The one or more distance element(s) is/are configured to allow the formation of at least one inner channel or fluid uptake area when the pipette tip extension is attached to a pipette tip. Each distance element may ensure that a pipette tip which is inserted into the pipette tip extension is positioned at a defined distance to the inner wall of the pipette tip extension, and thereby allows the formation of a fluid uptake area between the inserted pipette tip and the inner side of the pipette tip extension, and prevents that an inserted pipette tip fully abuts the inner side of the exterior wall of the pipette tip extension. The distance element(s) therefore function as spacers which subdivide the inner cavity of the pipette tip extension into a fluid uptake area, which is located between the distance elements and the inner wall of the pipette tip extension.

One distance element is sufficient to space an inserted pipette tip apart from the inner side of the exterior wall for forming a channel between the outer side of the inserted pipette tip and the inner side of the pipette tip extension. This channel may take up a fluid which is to be moved between the pipette tip and the pipette tip extension. The use of two or more distance elements may be preferred when a channel or fluid uptake area is desired which encloses the inserted pipette tip. Neither when using one nor when using more distance elements, a distance element does not extend circumferentially, so that the pipette tip extension is never closed towards the reception aperture. In the following, a distance element is described by using plural and singular interchangeably.

The distance elements subdivide the inner cavity into a pipette tip hosting area, which is located adjacent to the fluid uptake area and adjacent to the stop surface of the distance elements along the medial axis of the pipette tip extension, and which correspond to the later position of an inserted pipette tip. The depth of each distance element, which corresponds to the length, by which the respective distance element protrudes from the inner wall of the pipette tip extension towards the medial axis, may in particular define the volume of liquid which may be taken up in the fluid uptake area. The fluid uptake area is furthermore restricted by the outer wall of an inserted pipette tip and the inner wall of the pipette tip extension.

In an exemplary embodiment, the pipette tip extension may be of a chemically inert material, for example of a plastic polymer such as polypropylene, polyethylene, or a fluoroelastomer, or of glass or a metal such as aluminum or steel. A plastic has the advantage of being chemically inert, relatively cheap concerning production costs, and being slightly deformable. This allows to attach on the one hand the pipette tip extension in a friction fit manner to a pipette tip, and on the other hand to allow a sealing connection for example to a surface such as a surface of a microscope slide when the pipette tip extension is placed onto such a surface. It is also the preferred material for a disposable use. However, it is also possible to attach the pipette tip extension by means of form fit, e.g. by a tongue and groove connection, and/or to equip the distal end of the pipette tip extension with a sealing element to enable a sealing connection to a surface, as a surface of a microscope slide. Another suitable chemically inert material is polytetrafluoroethylene.

In another exemplary embodiment, the reception aperture may have a circular cross section, viewed orthogonally to the medial axis of the pipette tip extension, or have a deviating cross section. The reception aperture is suitable to allow insertion of a pipette tip, for example of a disposable pipette tip made of a plastic material, or of a so-called fixed pipette tip, made of a metal.

In a further exemplary embodiment, the inner diameter of the reception aperture of the pipette tip extension may be 6 mm, and the outer diameter of the tip of the pipette tip which shall enter the reception aperture may be about 1 mm. Such an extension is suitable for example when a disposable pipette tip is used having an outer diameter of approximately 5 mm which shall rest within the reception aperture of the pipette tip extension, or when a fixed tip is used having an outer diameter of approximately 4 mm. The space between the inner diameter of the reception aperture and/or the inner side of the exterior wall may be controlled by one or more distance elements.

In the context of the present invention, a disposable pipette tip is a pipette tip which may be taken up and/or ejected for example by a liquid handling device automatically. It is often made of a plastic material, and the connection to the liquid handling device may be realized by slightly deforming the plastic to achieve a friction fit connection between the tip and the device.

In the context of the present invention, a fixed pipette tip is connected to the liquid handling device mechanically by form fit, for example is screwed to the device. Mounting and dismounting typically requires a manual interaction. A fixed pipette tip is often made of a metal to ensure a stable shape.

The reception aperture at the proximal end of the pipette tip extension is during use at least partially open and thus not completely closed, e.g. by a cover, a seal, the pipette tip it is attached to, or a combination thereof. By remaining open to the surrounding atmosphere, sufficient pressure equalization is ensured when a liquid is dispensed from a pipette tip into the fluid uptake area of an attached pipette tip extension.

In an even further exemplary embodiment, the dispense aperture at the distal end of the pipette tip extension may have a circular shape or a circular cross section, respectively, viewed orthogonally to the medial axis of the pipette tip extension. The cross section of the dispense aperture may however depart from a circular shape, for example may be oval, triangular or may have another form, for example a polygonal form. The shape and/or the size of the dispense aperture may for example be adapted to a specific application or use of the pipette tip extension, for example to a specific area of interest of a tissue section which shall be addressed. Exemplarily, a particularly suitable size of a dispense aperture with an essentially circular shape may have a diameter of 1.65 mm. Suitable diameters may be in the range of 0.2 mm to 7 mm, in particular in the range of 1 to 2 mm.

In another exemplary embodiment, a distance element may for example be an inner bar, but also other types of protrusions at the inner side of the exterior wall of the pipette tip extension are possible, such as noses, as well as varying forms such as straight or snake- or wave-like bars. Combinations of protrusions of different types or forms are possible. Irregular forms are particularly suitable for providing an additional mixing effect to the liquid which is introduced into the pipette tip extension. It might be possible that only one inner distance element is provided at the inner side of the exterior wall, as long as it is suitable to allow the formation of a fluid uptake area in the inner cavity of the pipette tip extension. In the case only one distance element is used, the pipette tip hosting area may be acentric with respect to the medial axis of the pipette tip extension. A multitude of distance elements is also possible, which allows a more precise definition of the location of the pipette tip hosting area and the fluid uptake area within the inner cavity of the pipette tip extension. However, also the use of a multitude of distance elements allows an acentric positioning of a pipette tip within the inner cavity of the pipette tip extension. In particular by coordinating the depth of each distance element in dependence on the inner form of the pipette tip extension, it may be defined whether a pipette tip will be positioned within a pipette tip extension in a centric or acentric manner.

In an embodiment of the invention, which may be combined with any other of the embodiments which will or will be mentioned, unless there is a contradiction, at least one or more distance elements may provide a stop surface which is directed towards a medial axis of the pipette tip extension. The stop surface of a distance element is in the context of the present invention the contact point or contact surface which is abutted by a pipette tip when the pipette tip extension is attached to said pipette tip. The stop surface therefore marks the border at that specific position between the fluid uptake area and the pipette tip hosting area.

In an embodiment of the invention, which may be combined with any other of the embodiments which were or will be mentioned, unless there is a contradiction, the one or more distance elements at the inner side of the exterior wall extend in a direction from a proximal region of the pipette tip extension towards a distal region of the pipette tip extension. The distance elements are for example configured as inner bars of the same or varying width, and/or which are more elongated along the direction from the proximal to the distal end than they are wide, with the width being the dimension along a lateral direction. The use of at least two or more elongated distance elements is particularly suitable for a precise positioning of a pipette tip within the pipette tip extension. For example, a multitude of shorter distance elements, which are positioned for example in an irregular array in an alternating manner to each other and/or along the direction from the proximal end towards the distal end may be possible, a lower number of distance elements which are longer and arranged in a regular array at the inner side of the exterior wall, or a mixture thereof are possible. As an additional or alternative provision, it may be foreseen to provide for example an elastomeric plastic material onto the distance elements, which may be applied by a two component injection molding step, for enhancing the holding force of the pipette tip extension on the pipette tip.

In an embodiment of the invention, which may be combined with any other of the embodiments which were or will be mentioned, unless there is a contradiction, the distance elements extend essentially continuously from the proximal region of the pipette tip extension to the distal region of the pipette tip extension. Such an arrangement is particularly suitable for distance elements, which are for example configured as inner bars, and allows for example a simplification of the manufacturing process, e.g. in an injection molding process.

In an embodiment of the invention, which may be combined with any other of the embodiments which were or will be mentioned, unless there is a contradiction, the distance elements are arranged flush with respect to the proximal end of the pipette tip extension, e.g. from top to bottom of the pipette tip extension, or are arranged offset with respect to the proximal end of the pipette tip extension.

In an embodiment of the invention, which may be combined with any other of the embodiments which were or will be mentioned, unless there is a contradiction, the stop surfaces of the distance elements together form a common stop surface in the inner cavity which can be abutted by an inserted pipette tip, i.e. can be brought into alignment with an inserted pipette tip. The distance elements are in particular dimensioned so that the common stop surface approaches the medial axis towards the distal end of the pipette tip extension. The common stop surface contributes to the definition of the pipette tip hosting area and the boarder of the fluid uptake area, respectively.

In an embodiment of the invention, which may be combined with any other of the embodiments which were or will be mentioned, unless there is a contradiction, the exterior wall of the pipette tip extension is a circumferential wall which tapers towards the lower end of the pipette tip extension. The exterior wall may define the form and the outer dimensions of the pipette tip extension, which may be for example an oblong hollow body, which tapers at least in parts conically, e.g. in the region of the distal end, or tapers completely. The pipette tip extension may further be of an axially symmetric form, although an axially asymmetric form is possible too. Exemplarily, a pipette tip extension of 30 mm length is suitable, when a 200 μl volume pipette tip of 60 mm length shall be used and a liquid volume of 100 μl shall be dispensed and/or aspirated. The exterior wall may taper over the total length, or may additionally comprise for example cylindrical sections, which are preferably located at the proximal end of the pipette tip extension.

In an embodiment of the invention, which may be combined with any other of the embodiments which were or will be mentioned, unless there is a contradiction, the stop surface of each distance element is essentially parallel to the inner side of the exterior wall. This is particularly advantageous when the exterior wall of the pipette tip extension is adapted in shape to the exterior wall of a pipette tip to be inserted, that is when both walls, namely the exterior wall of the pipette tip extension and the exterior wall of the pipette tip, are arranged parallel to each other when assembled.

It is for example particularly useful to adapt the number of distance elements and/or depth of each distance element to the outer dimensions of a pipette tip to which the pipette tip extension shall be attached to. This adaptation may be done for example in view of the outer dimensions of the pipette tip and/or in view of the intended friction between the inserted pipette tip and the pipette tip extension, depending on whether a tight friction fit is intended or only a loose insertion is intended. It may further be useful to adapt these parameters to the volume of liquid which shall be taken up in the fluid uptake area of the pipette tip extension. For example, the uptake volume of a pipette tip extension might correspond to the nominal volume of the pipette tip to which the pipette tip extension shall be attached.

In an embodiment of the invention, which may be combined with any other of the embodiments which were or will be mentioned, unless there is a contradiction, the exterior wall and in particular the inner side of the exterior wall of the pipette tip extension has a shape which is adapted to an outer shape, i.e. the shape of the exterior wall, of a pipette tip to be inserted into the pipette tip extension. Adapted can inter alia mean that at least parts of the exterior wall of the pipette tip extension show a shape similar to the outer shape of a pipette tip but in a different dimension, preferably in a larger dimension.

In an embodiment of the invention, which may be combined with any other of the embodiments which were or will be mentioned, unless there is a contradiction, the pipette tip extension comprises a constriction element for controlling an insertion depth of a pipette tip within the pipette tip extension. The constriction element defines a gap having a gap height between a distal end of an inserted pipette tip and the distal end of the pipette tip extension. The pipette tip extension is attached to a pipette tip in such a manner that the distal end of both the pipette tip extension and the pipette tip point in the essentially same direction. The same applies to the proximal ends of the pipette tip extension and the pipette tip.

The constriction element functions as a stopper element which is able to restrict the insertion depth of a pipette tip when the pipette tip extension is attached to said pipette tip. The constriction element shall in particular prevent that the distal end of a pipette tip, which is inserted, is positioned flush with the distal end of the pipette tip extension or even protrudes from of the dispense aperture of the pipette tip extension. By restricting the insertion of a pipette tip to a defined depth within the inner cavity of the pipette tip extension according to the invention, a gap, or a corresponding gap height, is defined which is generated when a pipette tip is inserted until the insertion is stopped at the constriction element.

The gap height, which is e.g. generated when a pipette tip is inserted under a controlled manner with the aid of the constriction element, may for example be 0.1 mm to 1 mm.

In the context of the present invention, the gap describes the space between the distal end of the pipette tip extension and the distal end of a pipette tip, which is generated when the pipette tip extension and the pipette tip are assembled. The gap serves as a fluid connection between the inner cavity of the pipette tip and the fluid uptake area of the pipette tip extension and is also a part of the fluid uptake area. Upon placing the distal end of the pipette tip extension onto a surface, such as a surface of a microscope slide with a tissue section, the gap may be restricted towards the distal end of the pipette tip extension by closing the dispense aperture of the extension with said surface. Is the dispense aperture of the pipette tip extension closed, a fluid flow between the inner cavities of the pipette tip and the pipette tip extension is possible. Depending on the inner geometry at the distal end of the pipette tip, the volume of liquid and the flow rate can be influenced. A higher flow rate would in particular maximize the shear stress of the liquid on the tissue, while the flow must be sufficient to ensure that the liquid may contact the complete area on the surface of the addressed tissue covered by the dispense aperture of the pipette tip extension.

The constriction element may be located in the inner cavity of the pipette tip extension, or may be located otherwise as described exemplarily herein.

In an embodiment of the invention, which may be combined with any other of the embodiments which were or will be mentioned, unless there is a contradiction, the constriction element is formed by at least one of the following:

- a stop surface or a part thereof of the one or more distance elements which is directed towards a medial axis of the pipette tip extension, and/or
- a distal end of one or more distance elements, each distal end being an additional protrusion of the distance element towards a medial axis of the pipette tip extension and provides an abutment for the distal end of a pipette tip, to position the distal end of the pipette tip at an offset to the distal end of the pipette tip extension, the offset corresponding to the gap height, and/or an inner side of the exterior wall which protruded in the distal region of the pipette tip extension towards the medial axis of the pipette tip extension and which provides an abutment for the distal end of a pipette tip, and/or one or more support bars which extend laterally with respect to the medial axis of the pipette tip extension.

A constriction element may also be formed for example by other parts of the distance element.

When the constriction element is formed by the stop surface of the one or more distance elements, or parts thereof, the dimensions of the distance elements are adapted so that—when a pipette tip is inserted into the pipette tip extension—the pipette tip abuts the stop surfaces and comes to an end position within the inner cavity when the distal end of the pipette tip has not reached the distal end of the pipette tip extension. In this case, it is particularly the depth of the distance element that is defining how far the distance element protrudes into the inner cavity and which depth may be used to define the gap height.

When the constriction element is formed by a distal end of one or more distance elements (the distal end of a distance element being the end pointing essentially in the same direction as the distal end of the pipette tip extension), the distal end of the distance element is positioned offset to the distal end of the pipette tip extension and may restrict the inner cavity to a smallest lateral extension of said inner cavity. This may be achieved for example in that the distal end of the distance element comprises an additional protrusion which extends further towards the inner cavity. This additional protrusion is configured to be abuttable by the distal end of an inserted pipette tip and may keep then the pipette tip at a defined insertion depth within the pipette tip extension. In the resulting end position of an inserted pipette tip, its distal end is then positioned at an offset to the distal end of the pipette tip extension. The offset, which corresponds to a gap height, allows a fluid connection between the pipette tip and an attached pipette tip extension.

When the constriction element is formed by the inner side of the exterior wall which tapers at least in the distal region of the pipette tip extension towards the distal end and towards the medial axis of the pipette tip extension, the inner side of the exterior wall comprises instantaneously a protrusion of a depth that allows the distal end of a pipette tip to be placed on.

When the constriction element is formed by one or more support bars which extend laterally with respect to the medial axis of the pipette tip extension, the support bars essentially extend over the complete diameter of the inner cavity of the pipette tip extension, e.g. in form of a support ring. Such support bars may be arranged at the distal end region of the pipette tip extension, or may be arranged flush with the distal end, extending essentially over the complete cross sectional extension of the dispense aperture. For example, one support bar might be sufficient to position the distal end of an inserted pipette tip at a defined height offset from the dispense aperture of the pipette tip extension. It is however also possible that two or more support bars are provided which are arranged in an intersecting manner over the complete cross sectional extension of the pipette tip extension at the distal end.

It is also possible to provide several constriction elements of different configurations in one pipette tip extension, for allowing the use of one pipette tip extension with different types of pipette tips.

In an embodiment of the invention, which may be combined with any other of the embodiments which were or will be mentioned, unless there is a contradiction, the constriction element is formed by support bars extending laterally with respect to the medial axis of the pipette tip extension, the support bars forming a fluid-permeable sieve-like structure which is joined to the inner side of the exterior wall or which is an extension of the inner bars.

The use of a constriction element has the advantage that the insertion depth of a pipette tip within the pipette tip extension is controllable by a physical structure, which may be provided in the pipette tip extension, on the pipette tip, or separately as an insert. The control of the insertion depth may ensure that the pipette tip leaves a gap below its distal end when positioned within the pipette tip extension. The gap allows, when the dispense aperture of the pipette tip extension is closed e.g. by a prepared sample itself or by a part of the surface the sample is provided on, the liquid being transported from the pipette tip over the gap and the sample into the fluid uptake area of the pipette tip extension. The gap functions as a fluid connection between the inner cavity of the pipette tip and the fluid uptake area of the pipette tip extension. In an advantageous embodiment, the distance element(s) is or are arranged in such a manner that a continuous fluid uptake area is generated along the inner side of the pipette tip extension, which means that preferably no isolated channels are generated but that each generated fluid uptake area is in fluid connection with the other fluid uptake areas. This ensures that the liquid which is moved between the pipette tip and the pipette tip extension and over the sample remains homogeneously.

Although the constriction element is not compulsory for a controlled insertion of a pipette tip into the pipette tip extension, as the insertion depth might be controlled alone by the used force for the insertion, a constriction element is an additional safeguard to ensure a repeatable flow field (i.e. a repeatable gap height) above the sample, for excluding variations in the generated gap height for example due to geometrical tolerance in the manufacture of the pipette tip extension or the pipette tip, or due to variations in individual tissue surface properties. As an additional or alternative provision, it may be foreseen to provide for example an elastomeric plastic material onto the constriction element, which may be applied by a two component injection molding step, for enhancing the holding force of the pipette tip extension on the pipette tip.

In an embodiment of the invention, which may be combined with any other of the embodiments which will be mentioned, unless there is a contradiction, the pipette tip extension comprising at least two distance elements, preferably at least three distance elements, which are configures as elongated bars. For instance, the distance elements may be spaced equidistant or in an asymmetric manner.

In an embodiment of the invention, which may be combined with any other of the embodiments which were or will be mentioned, unless there is a contradiction, the exterior wall comprises at the distal end a seal for sealing the dispense aperture when the pipette tip extension is placed with the distal end onto a surface, for example, or into a sample. Exemplarily, the distal end of the pipette tip extension may be over-molded for example with an elastomeric material, such as an elastomeric plastic.

In an embodiment of the invention, which may be combined with any other of the embodiments which were or will be mentioned, unless there is a contradiction, the seal is provided by a separate material at the distal end of the pipette tip extension, which is over-molded or which is provided as an attachable seal.

In an embodiment of the invention, which may be combined with any other of the embodiments which were or will be mentioned, unless there is a contradiction, the pipette tip extension is configured as a two-part piece, wherein the two-part piece comprises an upper, first part providing the reception aperture, and a lower, second part providing the dispense aperture, wherein the first part and the second part may be plugged together to form the pipette tip extension, and wherein the second part is made of a seal material.

In an embodiment of the invention, which may be combined with any other of the embodiments which were or will be mentioned, unless there is a contradiction, the first part further comprises the one or more distance elements, and wherein the second part further comprises a constriction element for controlling an insertion depth of a pipette tip.

In an embodiment of the invention, which may be combined with any other of the embodiments which were or will be mentioned, unless there is a contradiction, the pipette tip extension comprises two pipette tip hosting areas for receiving two pipette tips. The pipette tip hosting areas are configured for receiving one pipette tip each. In this configuration, the pipette tip extension is configured for the treatment of one individual area on a sample per pipette tip hosting area. The pipette tip extension may comprise two seals, each seal surrounding individually the dispense aperture of each pipette tip hosting area, in other words of each pipette tip when inserted, respectively.

A further aspect of the invention concerns an assembly comprising a pipette tip extension according to the invention and at least one pipette tip as known in the art.

Another aspect of the invention concerns an assembly comprising at least one pipette tip extension as described above and a carrier for storing and/or holding one or more of the pipette tip extension(s). The carrier comprises one or more accommodation sites, wherein each accommodation sites is formed for holding and/or storing one pipette tip extension.

In an embodiment of the assembly, which may be combined with any other of the embodiments which were or will be mentioned, unless there is a contradiction, at least one accommodation site of the carrier, preferably each accommodation site, comprises a stopper which can be abutted by a distal end of a pipette tip when inserted into a pipette tip extension stored in said accommodation site. The stopper serves as a constriction element extending through the dispense aperture into the inner cavity of the pipette tip extension when it is stored in the accommodation site, thereby defining a gap height between the distal end of an inserted pipette tip and the distal end of the pipette tip extension.

Thus, in this embodiment, the constriction element is not located within the pipette tip extension but is located at a corresponding carrier.

An even further aspect of the invention concerns a pipette tip. The pipette tip is generated by a circumferential exterior wall having an outer side and an inner side and enclosing an inner cavity which is delimited by the inner side of the exterior wall. The circumferential exterior wall comprises a proximal section for attachment to a pipetting device, the proximal section comprising a proximal aperture. The circumferential exterior wall comprises further a distal section comprising a distal aperture as an inlet and/or an outlet for liquids, and an intermediate section in between. The pipette tip further comprises one or more distance elements at the outer side of the exterior wall, each distance element being arranged on the intermediate section or the distal section of the exterior wall and protrudes away from the exterior wall.

Defined also in other words, the pipette tip comprises a proximal end, a distal end, and a circumferential exterior wall extending between the proximal end and the distal end and tapering towards the distal end. The exterior wall, which has an outer side and an inner side, encloses an inner cavity which is delimited by the inner side of the exterior wall. The exterior wall forms at the proximal end a reception aperture for being attachable to a pipetting device and at the distal end a dispense aperture for aspirating and dispensing a liquid. The pipette tip further comprises one or more distance elements at the outer side of the exterior wall. Each distance element may provide a stop surface facing away from the outer side of the exterior wall of the pipette tip. The distance elements are arranged at a height of the exterior wall which ensures that a pipette tip extension which is attached to the distal end of the pipette tip, may abut the one or more distance elements, which is naturally the distal section of the pipette tip.

In an exemplary embodiment, the pipette tip may be of a chemically inert material, for example of a plastic polymer such as Polyethylene or Polypropylene, or of a metal, such as stainless steel or aluminum. A plastic material has the advantage of being chemically inert, relatively cheap concerning production costs, and being slightly deformable. Pipette tips made of a plastic material are also known as disposable pipette tips, as defined before, and are typically used for samples with high contamination risks. However, the pipette tip may be made of another material which is chemically inert, for example of a metal. Pipette tips made of metal are also known as fixed tips, as defined before. They are typically multiuse tips, which are cleaned between different applications.

In an exemplary embodiment, the reception aperture has a circular cross section, viewed orthogonally to the medial axis of the pipette tip extension. The reception aperture is configured to fluidly connect the pipette tip to a pipetting device, for example to receive a pipette cone of a liquid handling device, or to be inserted into a pipetting head. The dispense aperture may have a circular form or a circular cross section, respectively, viewed orthogonally to the medial axis of the pipette tip. The dispense aperture is configures to release and receive volumes of a fluid.

In the context of the present invention, a fluid may be any type of liquid or gas, for example a liquid sample, reagents, buffers, etc. The fluid may also be a mixture of different liquids (e.g. an emulsion), a mixture of different gases, a mixture of a liquid and a gas (i.e. an aerosol), or a mixture of a liquid and a solid dispensed in said liquid (i.e. a suspension). Solid particles may for example be abrasive particles such a sand, or may be magnetic beats. However, the fluid is preferably either a liquid or a gas.

The one or more distance element(s) is/are configured to allow the formation of an inner channel or a fluid uptake area between the pipette tip and a pipette tip extension when the pipette tip is inserted into a pipette tip extension. The pipette tip extension comprises a proximal end, a distal end, and an exterior wall extending between the proximal end and the distal end. The exterior wall, which has an outer side and an inner side, encloses an inner cavity which is delimited by the inner side of the exterior wall. The exterior wall forms at the proximal end a reception aperture for inserting a pipette tip. The exterior wall further forms at the distal end a dispense aperture. For instance, the pipette tip extension is designed similar to a pipette tip extension as already described but without comprising any distance elements. Each distance element ensures that a pipette tip which is inserted into a pipette tip extension is positioned at a defined distance to the inner wall of the pipette tip extension, and thereby allows the formation of a fluid uptake area between the inserted pipette tip and the inner side of the pipette tip extension, and prevent that an inserted pipette tip fully abuts the inner side of the exterior wall of the pipette tip extension. The distance elements therefore function as spacer which allows the formation of a fluid uptake area in the inner cavity of a pipette tip extension. Such a fluid uptake area is formed by the distance elements of the pipette tip, the outer side of the pipette tip, and the inner wall of the pipette tip extension. The depth of each distance element, which correspond to the length by which the respective distance element protrudes from the outer side of the exterior wall of the pipette tip, may in particular define the volume of liquid which may be taken up in the fluid uptake area.

In an exemplary embodiment, a distance element may for example be an outer bar, but also other types of protrusions at the outer side of the exterior wall of the pipette tip are possible, such as noses, as well as varying forms such as straight or snake- or wave-like bars. Combinations of protrusions of different types or forms are possible. Irregular forms are particularly suitable for providing an additional mixing effect to the liquid which is introduced into a pipette tip extension that is attached to a pipette tip.

In an exemplary embodiment, it might be possible that only one distance element is provided at the outer side of the exterior wall, as long as it is suitable to allow the formation of a fluid uptake area in the inner cavity of a pipette tip extension which is attached to the pipette tip. In the case only one distance element is used, the pipette tip may be positioned acentric with respect to the medial axis of an attached pipette tip extension. A multitude of distance elements is also possible, which allows a more precise positioning of the pipette tip within an attached pipette tip extension. The use of a multitude of distance elements allows an acentric positioning of a pipette tip within a pipette tip extension too. In particular by coordinating the depth of each distance element in dependence on the inner shape of a pipette tip extension to be attached, it may be defined whether a pipette tip will be positioned within a pipette tip extension in a centric or acentric manner.

The stop surface of a distance element of a pipette tip is in the context of the present invention the contact point or contact surface which is abutted by an inner wall of an attached pipette tip extension.

In an embodiment of the invention, which may be combined with any other of the embodiments which were and will be mentioned, unless there is a contradiction, the distance elements at the outer side of the exterior wall extend in a direction from the intermediate section of the pipette tip towards the distal section of the pipette tip. The distance elements are for example configured as outer bars of the same or of varying width and/or as outer bars which are more elongated along the direction from the proximal to the distal end than they are wide, with the width being the dimension along a lateral direction. The distance elements may further extend from a proximal region of the pipette tip towards a distal region of the pipette tip, when suited for spacing apart the pipette tip from a pipette tip extension. The use of at least two or more elongated distance elements is particularly suitable for a precise positioning of the pipette tip within a pipette tip extension, analogously to the previous discussed distance elements. For example, a multitude of shorter distance elements, which are positioned for example in an irregular array in an alternating manner to each other and/or along the direction from the proximal end towards the distal end may be possible, or a lower number of distance elements which are longer and arranged in a regular array at the inner side of the exterior wall, or a mixture thereof are possible.

In an embodiment of the invention, which may be combined with any other of the embodiments which were or will be mentioned, unless there is a contradiction, the distance elements extend essentially continuously to the distal region of the pipette tip. Such an arrangement is particularly suitable for distance elements, which are for example configured as inner bars, and allows for example a simplification of the manufacturing process, e.g. in an injection molding process. The distance elements may be arranged flush with respect to the proximal end of the pipette tip, e.g. from top to bottom of the pipette tip, or are arranged offset with respect to the proximal end of the pipette tip.

In an embodiment of the invention, which may be combined with any other of the embodiments which were or will be mentioned, unless there is a contradiction, one or more distance elements provide a stop surface facing away from the exterior wall, the stop surfaces of the distance elements together form a common stop surface which can be abutted by an attached pipette tip extension. The common stop surface abuts the inner side of an attached pipette tip extension and may provide a tight seat of the pipette tip within an attached pipette tip extension. The commons stop surface contributes to the definition of the pipette tip hosting area and the boarder of the fluid uptake are, respectively.

In an embodiment of the invention, which may be combined with any other of the embodiments which were or will be mentioned, unless there is a contradiction, the exterior wall of the pipette tip is a circumferential wall which tapers towards the lower end of the pipette tip. The exterior wall may define the outer, general form and the inner dimensions of the pipette tip. For example, the exterior wall may give the pipette tip the form of an essentially oblong hollow body, which tapers at least in parts conically, e.g. in the region of the distal end, or tapers completely. The exterior wall may taper over the total length in a regular manner or in distinct steps or may additional comprise for example cylindrical sections. The pipette tip may further be of an axially symmetric form, although an axially asymmetric form is possible too. The inner form or geometry of the pipette tip is in particular adapted to the nominal liquid volume and may also be adapted to distinct operational requirements of the pipette or pipetting device with which the pipette tip is to be used.

In an embodiment of the invention, which may be combined with any other of the embodiments which were or will be mentioned, unless there is a contradiction, the stop surface of each distance element is essentially parallel to the outer side of the exterior wall of the pipette tip.

In an embodiment of the invention, which may be combined with any other of the embodiments which were or will be mentioned, unless there is a contradiction, the pipette tip is configured for use as a disposable pipette tip or as a fixed pipette tip.

In an embodiment of the invention, which may be combined with any other of the embodiments which were or will be mentioned, unless there is a contradiction, the pipette tip comprises one or more constriction elements configured for restricting an insertion depth of the pipette tip within a pipette tip extension.

Another aspect of the invention concerns an assembly comprising a pipette tip, which comprises at least one distance element, and a pipette tip extension. The pipette tip extension of this assembly comprises a proximal end, a distal end, and an exterior wall extending between the proximal end and the distal end of the pipette tip extension. The exterior wall of the pipette tip extension has an outer side and an inner side and encloses an inner cavity which is delimited by the inner side of the exterior wall of the pipette tip extension. Further, the exterior wall of the pipette tip extension forms at the proximal end a reception aperture for inserting the pipette tip, and at the distal end a dispense aperture. For instance, the pipette tip extension is designed similar to a pipette tip extension as already described but without comprising any distance elements. The pipette tip extension is attachable to the distal end of the pipette tip, by inserting the distal end of the pipette through the reception aperture at the proximal end of the pipette tip extension, e.g. until the inner side of the pipette tip extension abuts the distance elements of the pipette tip.

In an embodiment of the invention, which may be combined with any other of the embodiments which were or will be mentioned, unless there is a contradiction, the exterior wall of the pipette tip extension of the assembly has a shape which is adapted to an outer shape of the pipette tip to be inserted into the pipette tip extension.

In an embodiment of the invention, which may be combined with any other of the embodiments which were or will be mentioned, unless there is a contradiction, the pipette tip and/or the pipette tip extension comprises a constriction element for controlling an insertion depth of the pipette tip into the pipette tip extension, the constriction element defining a gap having a gap height between a distal end of an inserted pipette tip and the distal end of the pipette tip extension.

The constriction element functions as a stopper element which is able to restrict the insertion depth of a pipette tip when the pipette tip is inserted into said pipette tip extension. The constriction element shall in particular prevent that the distal end of a pipette tip, which is inserted, is positioned flush with the distal end of the pipette tip extension or even protrudes from the dispense aperture of the pipette tip extension. By restricting the insertion of a pipette tip to a defined depth within the inner cavity of the pipette tip extension according to the invention, a gap, or a corresponding gap height, is defined which is generated when a pipette tip is inserted until the insertion is stopped at the constriction element. The gap height which is generated when a pipette tip is inserted under a controlled manner with the aid of the constriction element may be for example 0.1 mm to 1 mm.

The gap which is generated when a pipette tip is inserted provides a fluid connection between an inner cavity of the pipette tip and the inner cavity of the pipette tip extension. Controlling the gap height by the provision of one or more constriction elements allows controlling of a fluid flow between the pipette tip and the attached pipette tip extension. Another measure for controlling the fluid flow is, as mentioned before, the control of the size of the dispense aperture. In another embodiment, which is discussed later, the gap is closed by closing the dispense aperture at the distal end of the pipette tip extension, in that the distal end is placed in a sealing manner onto a surface, such as a surface of a microscope slide with a tissue section immobilized thereon.

In an embodiment of the invention, which may be combined with any other of the embodiments which were or will be mentioned, unless there is a contradiction, the constriction element is formed by at least one of the following:

the stop surfaces of the distance elements of the pipette tip;

the inner side of the exterior wall of the pipette tip extension which protruded in the distal region of the pipette tip extension towards the medial axis of the pipette tip extension and which provides an abutment for the distal end of a pipette tip;

one or more support bars of the pipette tip extension which extend laterally with respect to the medial axis of the pipette tip extension.

When the constriction element is formed by the stop surfaces of the distance elements, the dimensions of the distance elements are adapted so that—when the pipette tip is inserted into the pipette tip extension—the pipette tip abuts with the stop surfaces the inner wall of the pipette tip extension and comes to an end position within the inner cavity in which the distal end of the pipette tip has not reached the distal end of the pipette tip extension. In this case, it is particularly the depth of the distance element that is defining how far the distance element protrudes into the inner cavity and which depth may be used to define the gap height.

When the constriction element is formed by the inner side of the exterior wall of the pipette tip extension, which tapers at least in the distal region of the pipette tip extension towards the distal end and towards the medial axis of the pipette tip extension, the inner side of the exterior wall comprises instantaneously a protrusion of a depth that allows the distal end of a pipette tip to be placed on.

When the constriction element is formed by one or more support bars which extend laterally with respect to the medial axis of the pipette tip extension, the support bars essentially extend over the complete cross-sectional extension of the inner cavity of the pipette tip extension, thereby e.g. forming a support ring. Such support bars may be arranged at the distal end region of the pipette tip extension, or may be arranged flush with the distal end, extending essentially over the complete cross-sectional extension of the dispense aperture. For example, one support bar might be sufficient to position the distal end of an inserted pipette tip at a defined height offset from the dispense aperture of the pipette tip extension. It is however also possible that two or more support bars are provided which are arranged in an intersecting manner over the complete cross-sectional extension of the pipette tip extension at the distal end.

In an embodiment of the invention, which may be combined with any other of the embodiments which were or will be mentioned, unless there is a contradiction, the constriction element is formed by support bars of the pipette tip extension extending laterally with respect to the medial axis of the pipette tip extension, the support bars forming a fluid-permeable sieve-like structure which is joined to the inner side of the exterior wall or which is an extension of the inner bars.

The use of a constriction element has the advantage that the insertion depth of a pipette tip within the pipette tip extension is controllable by a physical structure, which may be provided in the pipette tip extension, on the pipette tip, or separately as an insert. The control of the insertion depth is important to ensure that the pipette tip leaves a gap below its distal end when positioned within the pipette tip extension. The gap allows, when the dispense aperture of the pipette tip extension is closed e.g. by a prepared sample itself or by a part of the surface the sample is provided on, the liquid being transported from the pipette tip over the gap and the sample into the fluid uptake area of the pipette tip extension. The gap functions as a fluid connection between the inner cavity of the pipette tip and the fluid uptake area of the pipette tip extension. In an advantageous embodiment, the distance element(s) is or are arranged in such a manner that a continuous fluid uptake area is generated along the inner side of the pipette tip extension, which means that preferably no isolated channels are generated but each generated fluid uptake area is in fluid connection with the other fluid uptake areas. This ensures that the liquid which is moved between the pipette tip and the pipette tip extension and over the sample remains homogeneously.

Although the constriction element is not compulsory for a controlled insertion of a pipette tip into the pipette tip extension, as the insertion depth might be controlled alone by the used force for the insertion, a constriction element is an additional safeguard to ensure a repeatable flow field (a repeatable gap height) above the sample for excluding variations in the generated gap height for example due to geometrical tolerance in the manufacture of the pipette tip extension or the pipette tip or due to variations in individual tissue surface properties.

In an embodiment of the invention, which may be combined with any other of the embodiments which were or will be mentioned, unless there is a contradiction, both the pipette tip extension and the pipette tip comprise at least one distance element each. The distance element(s) of the pipette tip extension and the distance element(s) of the pipette tip are preferably adapted to each other such that in assembled state a functionality is equal to an assembly comprising a pipette tip extension, which comprising all distance elements, and/or to an assembly comprising a pipette tip, which comprises all distance elements.

In an embodiment of the invention, which may be combined with any other of the embodiments which were or will be mentioned, unless there is a contradiction, the assembly further comprises a carrier for storing and/or holding one or more of said pipette tip extension(s). The carrier comprises one or more accommodation sites, each accommodation site being formed for holding and/or storing at least one pipette tip extension.

At least one accommodation site of the carrier may comprise a stopper which can be abutted by a distal end of a pipette tip when inserted into a pipette tip extension stored in said accommodation site. The stopper serves as a constriction element extending through the dispense aperture into the inner cavity of the pipette tip extension when it is stored and/or held in the accommodation site, thereby defining a gap height between the distal end of an inserted pipette tip and the distal end of the pipette tip extension. When a pipette tip is inserted into a pipette tip extension stored in the carrier, the pipette tip abuts the stopper of the carrier at the final position and generating a defined gap height above the dispense aperture of the pipette tip extension.

A further aspect of the invention concerns an insert for spacing apart a pipette tip for aspirating and/or dispensing a liquid and a pipette tip extension attached to a pipette tip. The insert comprises one or more distance elements which are dimensioned to establish a fluid uptake area between a pipette tip and a pipette tip extension attached thereto, the fluid uptake area being fluidly connected with a surrounding atmosphere at a proximal end of the attached pipette tip extension and an inner cavity of the pipette tip adjacent to a distal end of the pipette tip. In analogy to the distance elements described above, the one or more distance element is configured to be not circumferential, in other words a distance element or a combination thereof does not extend over the complete circumference of an inner side of a pipette tip extension which shall be spaced apart, but leaves the pipette tip extension open towards the proximal end when it is attached to a pipette tip.

In an embodiment of the invention, which may be combined with any other of the embodiments which were or will be mentioned, unless there is a contradiction, the insert comprises a connecting ring which holds the one or more distance elements, wherein the connecting ring comprises a depth which is smaller than a depth of the distance element, or wherein the connecting ring is a mount for a proximal end of a pipette tip extension, the mount having a diameter which is larger than a reception aperture at the proximal end of the pipette tip extension.

A further aspect of the invention concerns an assembly which comprises a pipette tip for aspirating and/or dispensing a liquid, a pipette tip extension, and one or more distance elements.

The pipette tip comprises a proximal end, a distal end, and a circumferential exterior wall extending between the proximal end and the distal end and tapering towards the distal end. The exterior wall has an outer side and an inner side and encloses an inner cavity which is delimited by the inner side of the exterior wall. The exterior wall forms at the proximal end a proximal aperture for attachment to a pipetting device, and at the distal end a dispense aperture for aspirating and/or dispensing a liquid.

The pipette tip extension comprises a proximal end, a distal end, and an exterior wall extending between the proximal end and the distal end. The exterior wall has an outer side and an inner side and encloses an inner cavity which is delimited by the inner side of the exterior wall. The exterior wall forms at the proximal end a reception aperture for inserting a pipette tip, and at the distal end a dispense aperture. The pipette tip extension is configured to be attachable to the distal end of the pipette tip.

The one or more distance elements are configured for spacing apart the pipette tip from the attached pipette tip extension. The one or more distance elements are dimensioned to establish a fluid uptake area between the inner side of the exterior wall of the pipette tip extension and the outer side of the exterior wall of the pipette tip, the fluid uptake area extending from the dispense aperture of the pipette tip extension up to the reception aperture of the pipette tip extension, and the fluid uptake area being in fluid connection with the surrounding atmosphere at the reception aperture and with the inner cavity of the pipette tip adjacent to the distal aperture of the pipette tip.

The pipette tip, the pipette tip extension, and the one or more distance elements may be configured according to any one of the embodiments previously described and combined to each other unless there is a contradiction. For example, in an embodiment of the invention, which may be combined with any other of the embodiments which were or will be mentioned, unless there is a contradiction, the one or more distance elements may be provided by the pipette tip extension, by the pipette tip, and/or by an insert, in an embodiment as described above.

For example, the insert comprises one or more distance elements. The insert can be configured for being inserted, e.g. in a friction fit manner, into the inner cavity of the pipette tip extension so that the distance element abuts the inner side of the exterior wall of the pipette tip extension. It is also possible that the insert is configured for being attachable to the outer wall of the pipette tip so that the distance element abuts the outer side of the exterior wall of the pipette tip. The insert is further configured to space apart the pipette tip from the pipette tip extension and to abut both the outer side of the exterior wall of the pipette tip and the inner side of the exterior wall of the pipette tip extension, when the pipette tip is inserted into the pipette tip extension.

By using the insert, a fluid uptake area is generated between the inner side of the pipette tip extension and the outer side of the pipette tip, when the pipette tip, the pipette tip extension and the insert are assembled.

The insert according to the invention can be combined with any embodiment of a pipette tip extension as described previously and/or any embodiment of a pipette tip. Distance elements can be arranged exclusively at the insert or in addition at the pipette tip extension and/or the pipette tip.

In an embodiment of the invention, which may be combined with any other of the embodiments which were or will be mentioned, unless there is a contradiction, the one or more distance elements are configured to provide a friction fit attachment of the pipette tip extension to the distal end of the pipette tip. A friction fit attachment may be achieved for example by adapting the dimensions of the distance element used, and/or by the provided number of distance elements, and/or by the arrangement of one or multiple distance elements between the outer side of the pipette tip and the inner side of the pipette tip extension.

In an embodiment of the invention, which may be combined with any other of the embodiments which were or will be mentioned, unless there is a contradiction, the assembly is configured to provide a continuous fluid connection between the inner cavity of the pipette tip, the inner cavity of the pipette tip extension and the surrounding atmosphere at the reception aperture of the pipette tip extension through the distal aperture of the pipette tip. Thereby, the inner cavity of the pipette tip extension, which is not occupied by an inserted pipette tip, constitutes a first fluid reservoir, and the inner cavity of the pipette tip constitutes a second fluid reservoir which are in fluid connection with each other.

In an embodiment of the invention, which may be combined with any other of the embodiments which were or will be mentioned, unless there is a contradiction, the assembly comprises a constriction element for controlling an insertion depth of the pipette tip within the pipette tip extension, the constriction element defining a gap height between the distal end of an inserted pipette tip and the distal end of the pipette tip extension. As discussed above, the constriction element may be provided by the pipette tip extension, by the distance element(s) and/or by the pipette tip.

In an embodiment of the invention, which may be combined with any other of the embodiments which were or will be mentioned, unless there is a contradiction, the assembly may be configured as an integrally formed workpiece, or as a workpiece formed of multiple parts which are assembled for example prior to the use of the assembly.

When the assembly is configured as an integrally formed workpiece, the assembly may for example be produced as a single workpiece by injection molding, or the assembly is produced as multiple parts which are connected to each other for example by gluing or welding. When the assembly formed of multiple parts, the distinct parts are produced separately and are assembled for example on the laboratory bench or another worktable for use. This has the advantage that the assembly may be put together prior to the required embodiment.

A further aspect of the invention concerns a method of using a pipette tip extension. The method comprises the steps of: providing a pipette tip extension, as described above, the pipette tip extension comprising one or more distance elements. Further provided is a pipette tip to which the pipette tip extension is adapted. For treating a sample, a liquid is aspirated into the pipette tip. The pipette tip is inserted into the pipette tip extension, when the pipette tip is filled with the liquid, although it is also possible to first insert the pipette tip into the pipette tip extension and then aspirate a liquid with the assembly. The pipette tip extension is then placed with a distal end of the pipette tip extension onto a sample, and an area of the sample is isolated from a remaining area with the distal end of the pipette tip extension. By adjusting for example, the pressure by which the pipette tip extension is positioned on the sample, or a corresponding surface on which the sample is positioned, and/or by the provision of a sealing material at the distal end of the pipette tip extension, a sealing effect may be generated.

The method further comprises the step of dispensing the liquid from the pipette tip, thereby generating a liquid flow from the pipette tip over the isolated area of the sample into a fluid uptake area of the pipette tip extension in the inner cavity of the pipette tip extension, the fluid uptake area being defined by the inner side of the exterior wall and the distance elements of the pipette tip extension, by the outer side of the inserted pipette tip, and by the flat surface below the dispense opening.

Another method step is the aspiration of the liquid back into the pipette tip, thereby generating a liquid flow in the opposite direction over the isolated area of the sample.

The method may be carried out with a pipette tip extension comprising the one or more distance, and a commonly available disposable pipette tip. Alternatively, the method may be carried out by using an assembly comprising a pipette tip extension, distance elements and a pipette tip in a configuration or a combination of configurations as described above.

A further aspect of the present invention concerns a method of treating an isolated area of a sample with a liquid. The method comprises the following steps:

- generating an isolated area of a sample by means of a first fluid reservoir, the first fluid reservoir enclosing a distal end of a second fluid reservoir, and the isolated area of the sample being sealed towards the remaining area of the sample,
- bringing the isolated area of the sample into fluid connection with the second fluid reservoir,
- dispensing a fluid from the second fluid reservoir into the first fluid reservoir, thereby generating a fluid flow on the sample at the isolated area in a first direction, and
- aspirating the fluid from the first fluid reservoir into the second fluid reservoir, thereby generating a fluid flow on the sample at the isolated area in a second direction.

The method provides for the treatment of a sample at an isolated area of a sample, while allowing the repeated use of the same fluid. Thereby, a locally well-defined and restricted treatment with a restricted volume of fluid may be achieved. When for example aiming to collect specific parts of a sample in a liquid, the method enables such a locally specific treatment and the collection and an enrichment of such parts in a well-defined volume of fluid. The provision of two fluid reservoirs between which the fluid may be moved at least once backward and forward (which is to be understood in the present context as a bidirectional movement), while the fluid is guided over the isolated area of the sample, allows the repeated collection of sample parts in the same fluid volume, so that the enrichment may occur.

In the method, it is possible to dispense the complete volume of fluid out the second fluid reservoir, to allow the complete volume of fluid contacting the isolated area of the sample. However, it is also possible that a part of the volume of fluid remains in the second fluid reservoir, in particular when a liquid is used as a fluid, for example to avoid that air from the pipette tip is drawn from the pipette tip onto the sample.

In an embodiment of the invention, which may be combined with any other of the embodiments which were or will be mentioned, unless there is a contradiction, the method comprises one or more of the following steps after the dispensing of the fluid from the second fluid reservoir into the first fluid reservoir:

- soaking the isolated area of the sample with the fluid for a certain time period, whereby during soaking, the fluid contacts the isolated area of the sample without the application of a fluid flow, and/or
- consecutively aspirating and dispensing the fluid between the second fluid reservoir and the first fluid reservoir, thereby exposing the isolated area of the sample to a repeated, bidirectional fluid flow, and/or
- subjecting the isolated area of the sample to a temperature treatment, in particular to a heating step and/or a cooling step, using a heating device and/or a cooling device in operative contact with the sample, thereby allowing the fluid to adapt to the temperature of the sample.

A soaking step may particularly suitable when aiming the sample being incubated over a certain time period with the fluid used. For example, a soaking step may be suitable when performing a cell lysis reaction on the sample using a cell lysis reagent.

Any soaking time may be suitable, depending on the assay and/or sample requirements. Exemplarily mentioned, if a procedural economy is of interest, a soaking time may not exceed 10 minutes. A soaking step may be applied after dispensing the complete volume of fluid out of the pipette tip or after dispensing only a part of the fluid volume.

A step of consecutively aspirating and dispensing the fluid between the second fluid reservoir and the first fluid reservoir leads to a repeated exposure of the isolated area of the sample to a bidirectional fluid flow. This allows an enhanced interaction of the fluid with the isolated area of the sample, and may thereby for example help increasing the yield of components from a sample being collected with the fluid, or increasing the yield of collected sample itself. The number of repeats may be chosen depending on the situation or an assay protocol, for example.

Subjecting the isolated area of the sample to a temperature treatment allows the fluid to adapt to the temperature of the sample. This may particularly be desired when for example the sample is a frozen and formalin fixed paraffin embedded tissue section, and a nucleic acid extraction shall be carried out on this sample. It may in this case be necessary to raise the temperature of the tissue to above the melting point of paraffin, which is about 56° C. for typical histopathology paraffin. However, alternatively, or additionally, the fluid may be adjusted with respect to the temperature.

In an embodiment of the invention, which may be combined with any other of the embodiments which were or will be mentioned, unless there is a contradiction, the method comprises one or more of the following steps after the aspirating of the fluid from the first fluid reservoir into the second fluid reservoir:

- generating a second isolated area of a sample by means of the first fluid reservoir, the first fluid reservoir continuously enclosing the distal end of the second fluid reservoir, and the second fluid reservoir further comprising the fluid, the sample being the same sample or another sample, and treating the second isolated area of the sample as defined before, and/or
- exchanging the first fluid reservoir by a third fluid reservoir, the configuration of the third fluid reservoir differing from the configuration of the first fluid reservoir with respect to the size of the area which is isolated and sealed towards the remaining area of the sample, and/or with respect to the volume of fluid which may be dispensed from the second fluid reservoir into the first or third fluid reservoir, and applying a bidirectional fluid flow to the second isolated area of the sample as defined before, and/or
- discarding the first fluid reservoir from the second fluid reservoir, and/or
- dispensing the fluid from the second fluid reservoir into a fluid container for further processing.

When generating a second isolated area and treating this area at least once with a bidirectional fluid flow as described above, a further enrichment of sample or sample components may be achieved when using the same fluid. This may particularly be advantageous when for example the components to be collected or isolated, respectively, generally occur in a small amount, and the same type of sample is available.

It may additionally or alternatively be possible to treat a second isolated area with the same liquid but addressing an area of interest of a different size. This may be achieved by exchanging the first fluid reservoir with a third fluid reservoir, which differs in view of the size of the area which is isolated. The size may be reduced or enlarged, or a different shape may be applied. This step might allow to collect a sample or components of an entire larger area of interest or of an area of interest having a shape which is otherwise difficult to address.

The step of discarding the first fluid reservoir from the second fluid reservoir may be carried out at any time point when the second fluid reservoir is required or desired to be free of the first fluid reservoir at the distal end. The same applies for any third or further fluid reservoir which is attached to the second fluid reservoir.

The step of dispensing the fluid from the second fluid reservoir into a fluid container makes the fluid being available for any other following processing steps. Fluid container may be any type of container for fluids, for example container for liquids being part of a laboratory equipment, such as tubes, microplates, or other.

In an embodiment of the invention, which may be combined with any other of the embodiments which were or will be mentioned, unless there is a contradiction, the dispensing of the fluid and/or the aspirating of the fluid is carried out with the total volume of a fluid present in the second reservoir and/or with a partial volume of the fluid present in the second reservoir. As mentioned above moving only a partial volume of the fluid may be advantageous to avoid drawing in air.

In an embodiment of the invention, which may be combined with any other of the embodiments which were or will be mentioned, unless there is a contradiction, the sample is selected from a group comprising:

- a tissue, preferably a tissue prepared for histological analysis,
- a tissue section, preferably provided on a surface, such as a surface of a microscope slide,
- a cell or a cell culture thereof, including a bacterial cell, a fungi cell, a plant cell, an animal cell, and/or a human cell, and
- one or more component of a tissue, tissue section, cell and/or cell culture.

A tissue may for example be a tissue isolated from a sample organism, which has been treated for conserving the structure and components of the tissue for a later analysis such as a histopathological analysis, for example by a formalin fixation step, a fixation with glutaraldehyde, a cryo-conservation step, or an alcohol fixation step, or other fixation steps available. A tissue may also be a part of a tissue which shall be subjected to further analysis. The tissue or a part thereof may be provided in an embedding medium, such as paraffin or other. The tissue may further be provided on a carrier, for example on a microscope slide or other means required for example for the subsequent preparation of tissue sections. The tissue may be isolated from a micro-organism, a plant, an animal or a human.

A tissue section is a section of a tissue of interest, for example comprising a specific cell type or cellular context. A tissue section is generated typically from an isolated tissue, for example of a patient probe comprising an organic tissue with or without cancer cells. Typical tissue sections are for example of a thickness of 5 μm up to 30 μm. Thinner or thicker sections are possible, wherein thicker sections may also be considered as a part of a tissue. Tissue sections are typically provided in an embedding medium such as paraffin, or a medium for cryosections, and before the preparation of the section, the tissue has preferably been conserved by a fixation step. However, the tissue may also be directly frozen without a fixation step.

A cell may be any prokaryotic or eukaryotic cell which shall be subjected to an analysis. These may be for example a bacterial cell, including an archaebacterial cell. Exemplarily, a bacterial cell may be an *Escherichia coli* cell or other cells involved in standard laboratory assays, or other bacterial cells for example involved in a disease. A cell may also be a fungal cell, for example a *Saccharomyces cerevisiae* cell. The cell may also be a cell derived from another eukaryotic organism, for example of a plant, an animal or a human.

A cell culture of a sample cell is a culture of a cell or a cell population in or on a culture medium or nutrient solution outside of the organism. The cell culture medium is adapted to the requirements of the cell to be cultured and to the requirements of the assay. For example, a bacterial cell may be cultured a semi-solid or solid cell culture medium in form of a so-called agar plate. It is also known to culture cells in a liquid culture medium, which is typically used for animal or human cell culture. Cells of a cell culture may be primary cells (directly generated from an organism) or a cell line (immortalized cells).

A component of a tissue, tissue section, cell and/or cell culture may be a protein, a nucleic acid, a carbohydrate, components comprising fatty acids, vitamins, hormones, other components of a cell, and/or combinations thereof, for example.

In an embodiment of the invention, which may be combined with any other of the embodiments which were or will be mentioned, unless there is a contradiction, the the fluid is a liquid which is selected from a group comprising:

- a buffer or cell culture medium for cultivating and/or maintaining and/or storing one or more samples,
- a reagent for treating the sample, preferably for performing a cell lysis reaction, a staining reaction, a binding reaction, or for removing an embedding medium.

A cell culture medium is a medium suitable for a short-term or long-term culture of a cell or a cell population.

A buffer is a reagent comprising a pH stabilizing component, for example in a salt solution. Examples are a HEPES-(Hydroxyethylpiperazin-Ethansulfonic acid) buffer, a natriumdihydrogenatephosphate buffer, or a TRIS based (Tris (hydroxymethyl)-aminomethane) buffer.

A reagent for performing a cell lysis reaction is for example a buffer comprising proteinase K, a Quick Extract FFPE DNA extraction solution (from Illumina Quick Extract FFPE DNA extraction kit), or a direct reagent form an Ion AmpliSeq Direct FFPE DANN kit.

A reagent for a staining reaction may be any reagent for staining an organ, cell type, or components thereof. Established staining techniques are for example immunohistological staining using antibodies, reagents for intercalating into nucleic acids such as Ethidium bromide, or other staining reagents for detecting for example basophilic, acidophilic or neutrophilic structures.

A reagent for carrying out a binding reaction may for example comprise antibodies, and/or magnetic beads.

A reagent for removing an embedding medium, for example for removing a paraffin embedding, may be an organic solvent such as Xylene, mineral oil, or Cyclohexane.

In an embodiment of the invention, which may be combined with any other of the embodiments which were or will be mentioned, unless there is a contradiction, the sample is a tissue section provided on a microscope slide, and the fluid is a liquid for performing a cell lysis reaction and for collecting one or more components of the tissue section selected from a group comprising:

- a nucleic acid,
- a protein,
- component comprising a carbohydrate, a fatty acid, a vitamin, and/or a hormone, or other cellular compounds, and/or
- combinations thereof.

In an embodiment of the invention, which may be combined with any other of the embodiments which were or will be mentioned, unless there is a contradiction, the tissue section is a formalin fixed, paraffin embedded tissue section from a biopsy or from a resected tumor.

In an embodiment of the invention, which may be combined with any other of the embodiments which were or will be mentioned, unless there is a contradiction, one or more of the method steps are carried out manually using a pipettor or automatically using a liquid handling workstation.

Pipettors are hand-held pipettes for the manual use by a laboratory staff. A manual use may have the advantage that the method may be carried out with method steps which are individually chosen and adapted to the actual situation.

Performing the method automatically by use of a liquid handling workstation has the advantage that a high number of samples may be treated in an accurate way with consistent quality and specificity. Liquid handling workstations are typically under the control of one or more controller, which control for example a pipetting robot, the liquids used, steps of aspirating, dispensing, mixing or other pipetting steps, movements of pipettes, containers, etc.

In an embodiment of the invention, which may be combined with any other of the embodiments which were or will be mentioned, unless there is a contradiction,

- the first fluid reservoir is provided by a pipette tip extension configured to be attachable to a distal end of a pipette tip, the pipette tip extension comprising a proximal end, a distal end, and an exterior wall extending between the proximal end and the distal end, the exterior wall forming at the proximal end a reception aperture for inserting a pipette tip, and at the distal end a dispense aperture,
- the second fluid reservoir is provided by a pipette tip for dispensing and/or aspirating a liquid, wherein the pipette tip extension is attached to the pipette tip by inserting a distal end of the pipette tip into the pipette tip extension through the reception aperture of the pipette tip extension, and wherein a fluid connection between pipette tip extension and the pipette tip is generated by means of at least one distance element which spaces apart the pipette tip from the pipette tip extension.

In an embodiment of the invention, which may be combined with any other of the embodiments which were or will be mentioned, unless there is a contradiction, the pipette tip, the pipette tip extension and the at least one distance element form a functional assembly formed of multiple parts or formed as a one integral workpiece.

In an embodiment of the invention, which may be combined with any other of the embodiments which were or will be mentioned, unless there is a contradiction, the at least one distance element is dimensioned to establish a fluid uptake area between an inner side of the exterior wall of the pipette tip extension and the outer side of an exterior wall of the pipette tip, the fluid uptake area extending from the dispense aperture of the pipette tip extension up to the reception aperture of the pipette tip extension, and the fluid uptake area being in fluid connection with the surrounding atmosphere at the reception aperture and with an inner cavity of the pipette tip adjacent to the distal aperture of the pipette tip.

In an embodiment of the invention, which may be combined with any other of the embodiments which were or will be mentioned, unless there is a contradiction, the at least one distance element is provided by:

the pipette tip extension, and/or the pipette tip, and/or a separate insert.

In an embodiment of the invention, which may be combined with any other of the embodiments which were or will be mentioned, unless there is a contradiction, the at least one distance element is configured to provide a friction fit attachment of the pipette tip extension to the distal end of the pipette tip.

In an embodiment of the invention, which may be combined with any other of the embodiments which were or will be mentioned, unless there is a contradiction, the pipette tip is selected from a group comprising disposable pipette tips and fixed pipette tips.

In an embodiment of the invention, which may be combined with any other of the embodiments which were or will be mentioned, unless there is a contradiction, the pipette tip, the pipette tip extension and the at least one distance element form an assembly which comprises at least one constriction element for controlling an insertion depth of the pipette tip within the pipette tip extension, the constriction element defining a gap height between the distal end of the inserted pipette tip and the distal end of the pipette tip extension.

The method as described above is particularly suitable to be carried out with one of the pipette tip extension described herein, in any embodiment mentioned herein, together with a pipette tip in and embodiment described herein and at least one distance element described herein. The configuration of the pipette tip extension, the pipette tip and the distance element(s) may be mutually adapted to form an assembly described herein.

BRIEF DESCRIPTION OF THE DRAWINGS

Embodiments of the current invention are described in more detail in the following with reference to the figures. These are for illustrative purposes only and are not to be construed as limiting. It shows FIG. 1A a schematic, three-dimensional side view of a pipette tip extension, in which in particular a view of the proximal reception aperture and three distance elements configured as inner bars can be seen.

DETAILED DESCRIPTION OF THE INVENTION

Figure 1B:
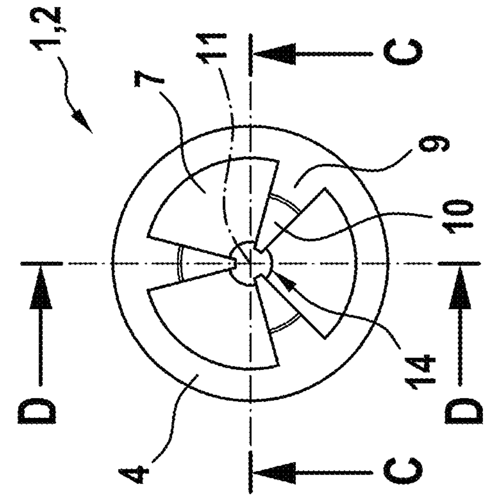
FIG. 1B a schematic view of the proximal end of the pipette tip extension of FIG. 1A with the intersection planes indicated on which the sectional drawings shown in FIG. 1C and FIG. 1D are based.

FIGS. 1A to 1D show an exemplary embodiment of a pipette tip extension 1 in a schematic drawing. The pipette tip extension 1 comprises a proximal end 2 and a distal end 3. An exterior wall 4 extends between the proximal end 2 and the distal end 3. The exterior wall 4, comprising an outer side 5 and an inner side 6, encloses an inner cavity 7. A medial axis 11 extends from the proximal end 2 towards the distal end 3 in a longitudinal direction. Thus, the inner cavity 7 is delimited, when seen in a direction orthogonally to and pointing away from the medial axis, by the inner side 6 of the exterior wall 4.

At the proximal end 2, the exterior wall 4 forms a reception aperture 8, and at the distal end 3, the exterior wall 4 forms a dispense aperture 14. As shown in following Figures, the reception aperture 8 is configured to receive a pipette tip 12 when the pipette tip extension 1 shall be attached to the pipette tip 12. The diameter of the reception aperture 8 is in particular bigger than the diameter of a pipette tip 12 at the same height when the pipette tip 12 is introduced into the pipette tip extension 1 in an end position. As a consequence, the outer side of the pipette tip 12 does not touch the inner side 6 of the exterior wall 4 of the pipette tip extension 1; instead, the pipette tip extension 1 comprises one or more distance elements 9 which provide a seat of the pipette tip 12 within the pipette tip extension 1 in which the outer side of the pipette tip 12 is spaced apart from the inner side 6 of the pipette tip extension 1. Though it might be possible that the pipette tip 12 touches the inner side 6 of the pipette tip extension at one contact point, the remaining outer side of the pipette tip 12 is spaced apart from the inner side 6 of the pipette tip extension 1 by one or more distance elements 9. Possible seats are explained also for FIGS. 11A to 11D.

Figure 1A:
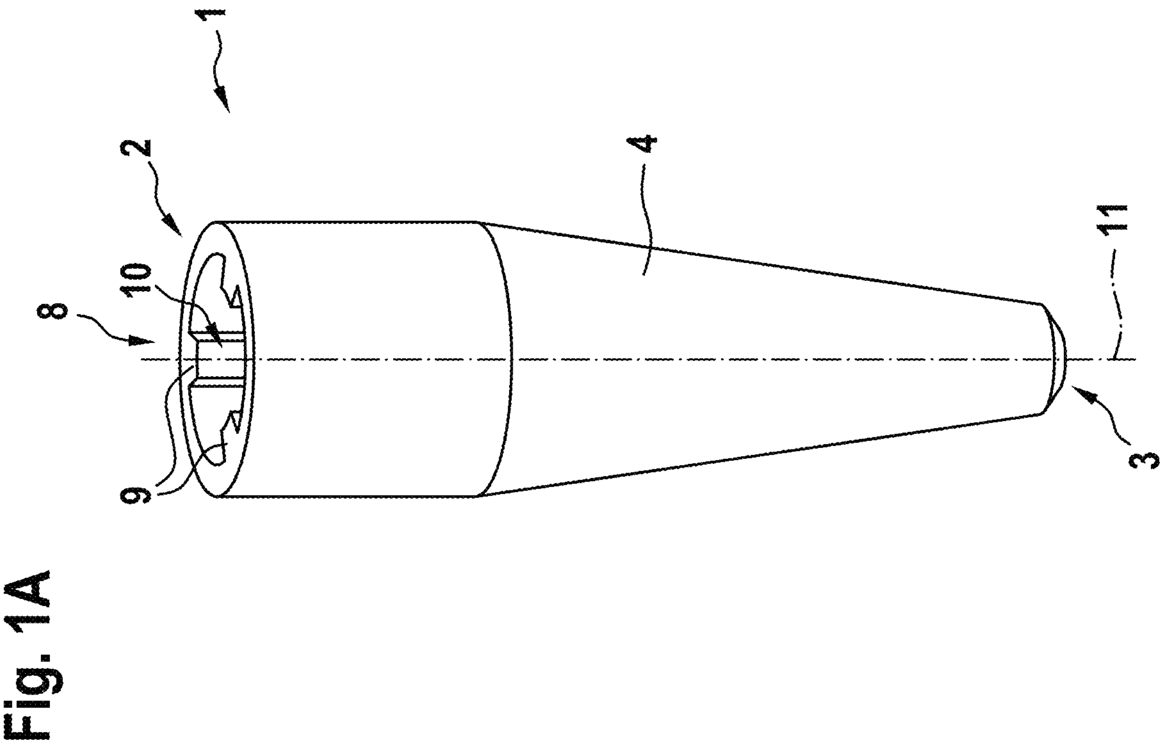
FIG. 1C a schematic sectional drawing of the pipette tip extension of FIG. 1A based on intersection plane C-C with a frontal view of the stop surface of one inner bar.
FIG. 1D a schematic sectional drawing of the pipette tip extension of FIG. 1A based on intersection plane D-D with one inner bar gated by the section and one inner bar shown in a lateral view.
FIG. 12A-1 schematic views of the dispense aperture of various embodiments of pipette tip extensions showing different variants of shapes of a dispense aperture.

In FIG. 1A, a three-dimensional side view of the pipette tip extension 1 is shown. The view is particularly showing the proximal end 2 with the reception aperture 8. The pipette tip extension 1 shown comprises in this case three distance elements 9. Each distance element 9 is configured as an elongated bar, which is a protrusion from the exterior wall 4 into the inner cavity 7, in this case protruding towards the medial axis 11. In the embodiment shown, each bar is arranged flush with respect to the proximal end 2 and extends continuously from the proximal end 2 of the pipette tip extension 1 almost up to its distal end 3 (see FIGS. 1C and 1D).

In this case, each of the three bars comprise a stop surface 10. This stop surface 10 is in this case the surface of a bar which faces towards the medial axis 11 of the pipette tip extension 1. The size of a stop surface 10 is determined by the shape and dimensions of a distance element, which are the length, depth, and width in the case of a bar (see e.g. FIG. 13C). The stop surface 10 can be abutted by a pipette tip and provides for a safe seat of the pipette tip 12 within the pipette tip extension 1.

The pipette tip extension 1 shown comprises a proximal part where the exterior wall 4 forms a hollow cylinder, while, at an intermediate part and the distal part, the exterior wall 4 tapers towards the distal end 3. The dimensions of the elongated bars are adapted to the shape of the pipette tip extension 1 as given from the shape of the exterior wall 4, so that the stop surface 10 of each bar extends parallel to the inner side 6 of the exterior wall 4 (FIG. 1D).

FIG. 1B shows a schematic view onto the proximal end 2 of the pipette tip extension of FIG. 1A. The distance elements 9, in this case the bars, are formed in this embodiment as a part of the exterior wall 4. As will be discussed below, the distance elements 9 may however be provided as a separate insert 16, or as a part of a pipette tip 12 to be inserted. In the embodiment shown in FIG. 1B, the distance elements 9 extend from the proximal end 2 towards the distal end 3. Shown is for each distance element 9 in addition the edge from the proximal end 2 to the surface which faces towards the inner cavity 7 and the medial axis 11. From this view, the progression of this surface towards the dispense aperture 14 is visible too. As this surface will be abutted by a pipette tip 12 and may provide a stopper, which prevents the pipette tip 12 from being inserted further into the pipette tip extension 1, this surface is also called a stop surface 10. Viewed from above, the distal ends of the three distance bars project into the dispense aperture 14. Indications of the intersection planes, on which the sectional drawings shown in FIGS. 1C and 1D are based, are indicated.

Figure 1D:
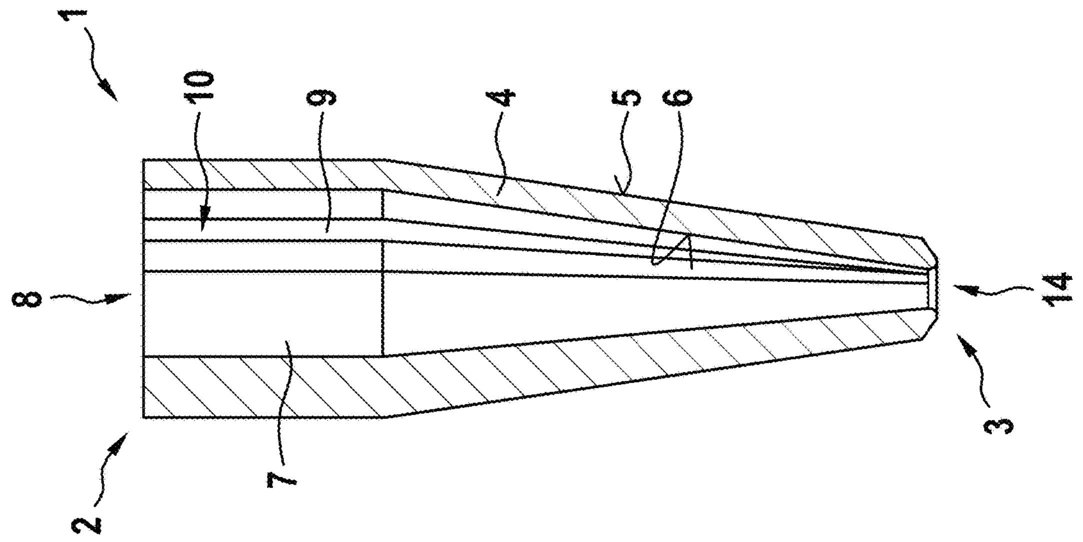
Figure 1C:
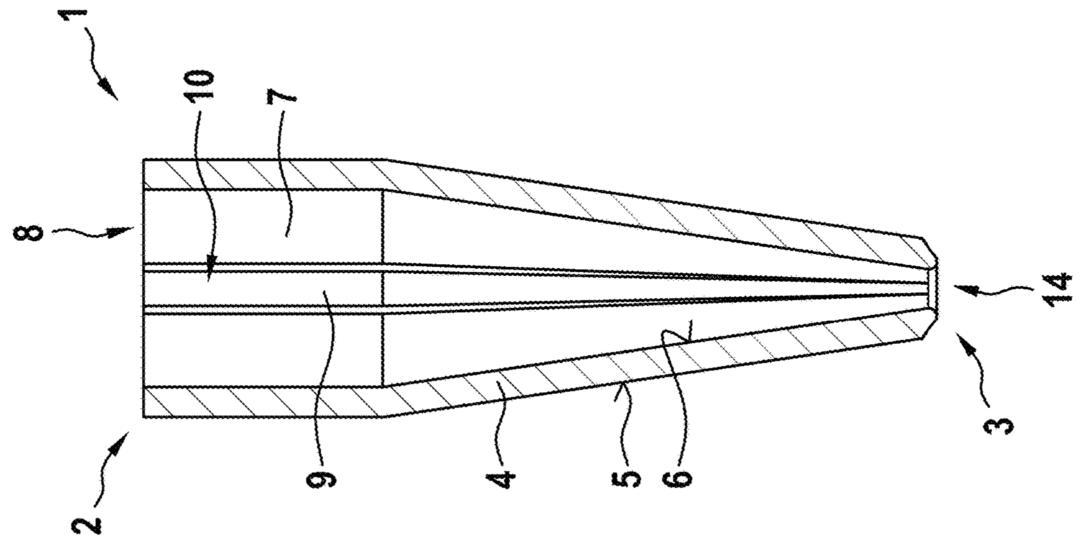

FIG. 1C shows a schematic sectional drawing based on the intersection plane C-C shown in FIG. 1B. The drawing shows a longitudinal section through the pipette tip extension 1 of FIG. 1A, with a frontal view of one of the bars which are used as distance element 9. In that view, the stop surface 10 of the bar can be seen. The inner bar show extends over almost the entire length of the pipette tip extension 1, beginning flush with the proximal end. However, the inner bar does not reach up to the distal end 3 of the pipette tip extension but leaves a gap with a gap height h to the distal end 3. The distal end 3 of this pipette tip extension 1 is shown in a higher magnification in FIG. 6A, where the gap height h is also indicated.

FIG. 1D shows a schematic sectional drawing based on the intersection plane D-D shown in FIG. 1B. The drawing shows a longitudinal section through the pipette tip extension 1 of FIG. 1A, with a frontal view of one of the bars being cut (left side), and one of the bars shown in a side view.

Figure 2A:
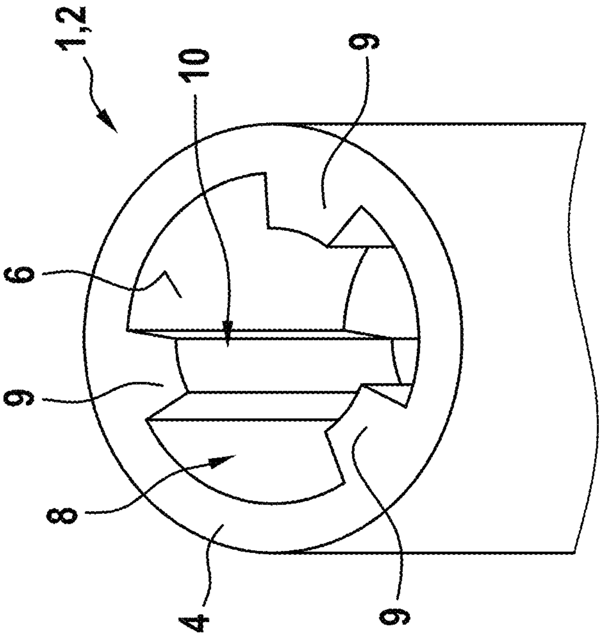
FIG. 2A a schematic drawing of the proximal end of an embodiment of a pipette tip extension comprising distance elements configured as bars, with the inner bars being arranged flush with the proximal end.

FIG. 2A shows schematically the proximal end 2 of a pipette tip extension 1, which essentially corresponds to the embodiment of the proximal end 2 of the pipette tip extension shown in FIG. 1A with three distance elements 9 being arranged flush to the proximal end 2.

Figure 2B:
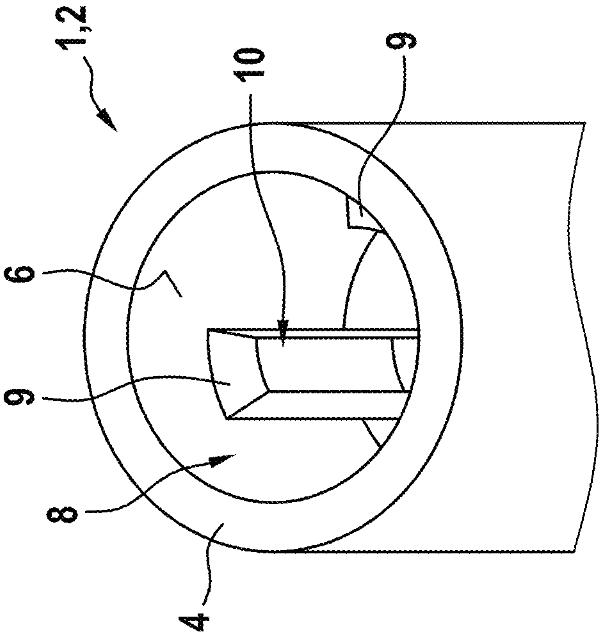
FIG. 2B a schematic drawing of the proximal end of another embodiment of a pipette tip extension comprising distance elements configured as bars, with the inner bars being arranged offset with respect to the proximal end.

FIG. 2B shows schematically the proximal end 2 of a pipette tip extension 1 in another embodiment. The pipette tip extension 1 comprises three distance elements 9 too, which are, in this embodiment, configured as elongated bars. In the embodiment shown, the bars are arranged offset to the distal end 3 of the pipette tip extension 1. In other words, the proximal end of each bar is spaced apart from the proximal end 2 of the pipette tip extension 1. The distance elements 9 may be integrally formed with the exterior wall 4, or they may be separate pieces which are attached to the inner side 6 of the exterior 4.

Figure 3B:
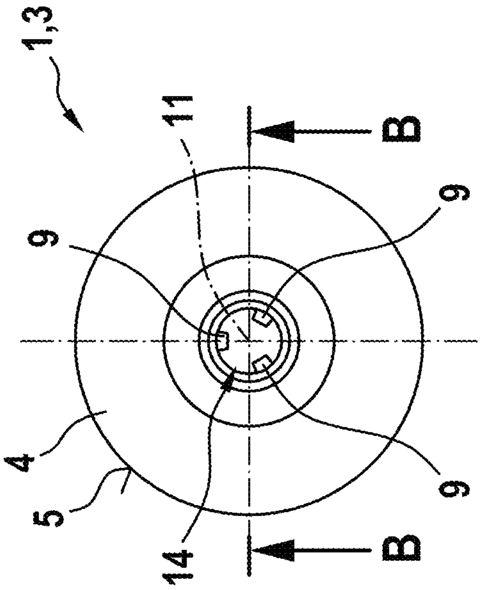
FIG. 3B a schematic drawing of a view of the distal end of the pipette tip extension of FIG. 3A, FIG. 4A a schematic drawing of the distal end of a further embodiment of a pipette tip extension, the distal end comprising a dispense aperture and sieve-like support bars forming the constriction element.
Figure 3A:
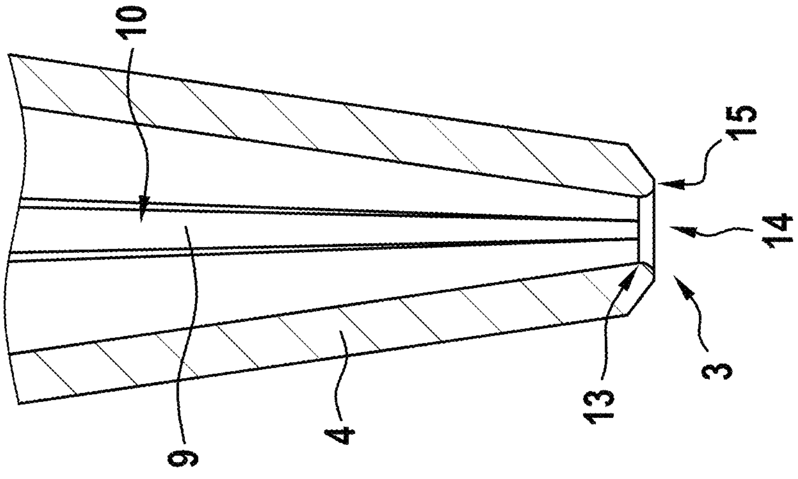
FIG. 3A a schematic drawing of the distal end of an embodiment of a pipette tip extension, with a distal end of the pipette tip extension comprising a dispense aperture and an inner bar as a distance element extending to the distal end and forming there a constriction element.

FIG. 3A shows schematically in a higher magnification the distal end 3 of a pipette tip extension 1 in a partial longitudinal section. The distance element 9 being visible in this section is configured as an elongated bar. The surface of the bar, which is abutted by a pipette tip 12 when the pipette tip extension 1 is attached thereto, is also fully visible in frontal view. This surface is called the stop surface 10, because it will restrict the position of the pipette tip 12 towards the inner side 6 of the pipette tip extension 1 when the pipette tip 12 is moved into the pipette tip extension 1.

The bar extends towards the dispense aperture 14 but is arranged with an offset to the distal end 3. The length of the offset towards the distal end 3 may correspond to a gap height h which is generated when a pipette tip 12 is inserted into the pipette tip extension 1 and when the distal end 30 of the pipette tip 12 is positioned flush with the distal end of the distance elements 9 (see FIG. 6A). In this case, the distal end of the distance element 9 generates the smallest possible lateral extension of the inner cavity I1, which the distal end of the pipette tip cannot pass any more during the insertion process, and thereby restricts its further insertion towards the distal end 3 of the pipette tip extension 1.

However, a constriction function may not necessarily be provided by the distance element(s) at their distal end of the distance element(s), but at a position a bit closer to the proximal end 2. The force with which a pipette tip 12 is pressed towards the distal end 2 of the pipette tip extension has also an influence onto the insertion depth and the resulting gap height h, because a sufficiently high insertion force may press the distal end 30 of a pipette tip 12 beyond a constriction site, when the constricting element allows a slight deformability upon the pressure applied.

The distal end 3 of the pipette tip extension 1 comprises a seal section 15 which will seal the dispense aperture 14 when the distal end 3 of the pipette tip extension is pressed onto a surface providing a sample or into a prepared sample. The seal section 15 may simply be the most distal part of the pipette tip extension which will contact the surface or the prepared sample. The seal effect may be promoted for example by a slight deformation of the material at the most distal end, when the distal end 3 of the pipette tip extension 1 contacts for example a rigid surface, for example the surface of a microscope slide. The distal end 3 of the pipette tip extension 1 may for example penetrate tissue of a tissue section until it abuts the rigid surface of the microscope slide. The seal effect must however not necessarily be hundred percent; for example, the surrounding tissue may also provide a “seal effect”, so that it might be sufficient that the distal end 3 of the pipette tip extension 1 is simply pressured or pressed into a biological sample, in particular a prepared sample, by a sufficient depth.

The size of the seal section 15 as shown in FIG. 3A is in this case also influenced by the geometry of the distal end 3 of the pipette tip extension 1. In this example, inclined sections are used adjacent to the indicated seal section 15.

FIG. 3B shows schematically a view onto the distal end 3 of the pipette tip extension 1 shown in FIG. 3A with three distance elements 9. In this view, the projection of the three distance elements into the dispense aperture 14 can be seen, as well as the different sections of the pipette tip with differing inclined surfaces.

Figure 4B:
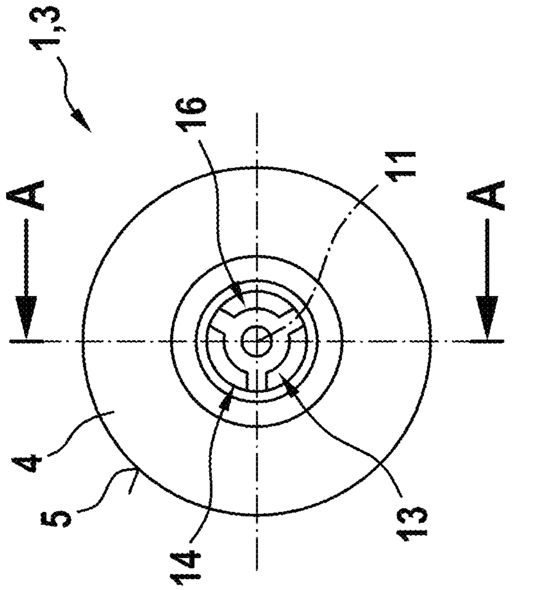
FIG. 4B a schematic drawing of a top view of the distal end of the pipette tip extension of FIG. 4A.
Figure 4A:
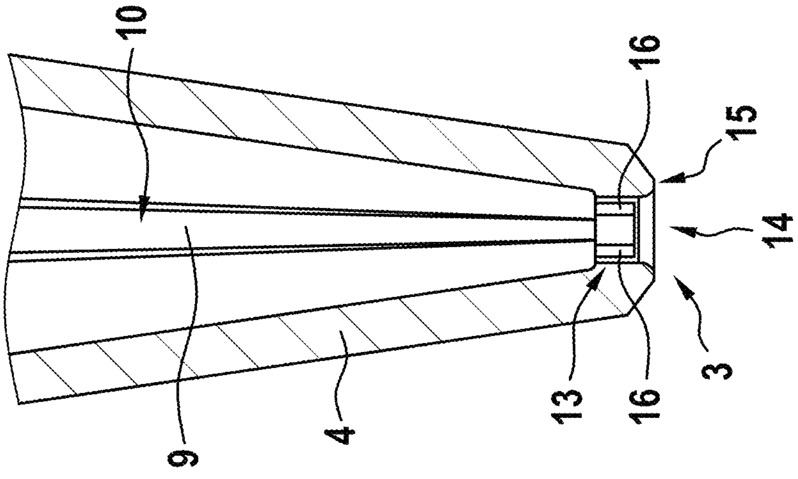

FIG. 4A shows in a schematic drawing another embodiment of the distal end 3 of a pipette tip extension 1. In this case, the distal end 3 comprises above the dispense aperture 14 sieve-like support bars 16 which form a constriction element 13. A frontal view of the stop surface 10 of an elongated distance element 9 is also given. FIG. 4B shows schematically a view of the distal end 3 of FIG. 4A.

The support bars 16 extend laterally with respect to the medial axis 11 of the pipette tip extension 1. In the embodiment shown, they form a fluid-permeable sieve-like structure at the distal end. The support bars 16 serve as constriction which prevents that the pipette tip 12 is inserted further towards the distal end 3 of the pipette tip extension 1 and that a gap is generated between the distal end 30 of the pipette tip 12 and the distal end 3 of the pipette tip extension 1. The sieve-like arrangement ensures that liquid which dispensed out of the pipette tip 12 may nevertheless flow into the generated gap above the dispense aperture 14.

Figure 5B:
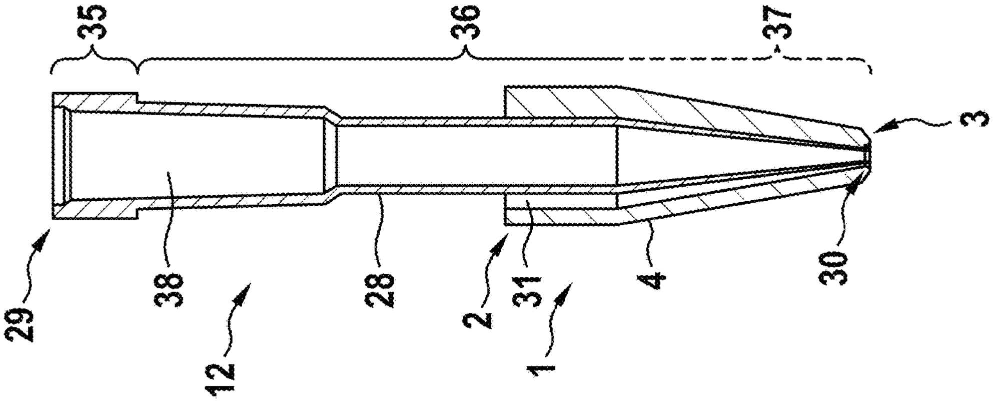
FIG. 5B a schematic sectional drawing of the assembly of FIG. 5A.
Figure 5A:
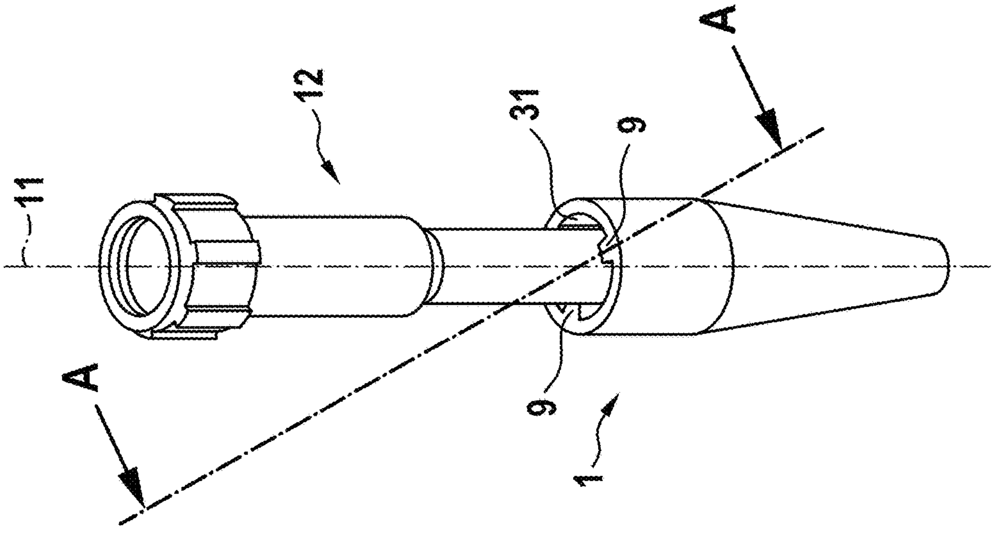
FIG. 5A a schematic three-dimensional side view of an assembly comprising a pipette tip extension, a pipette tip and distance elements, with the pipette tip extension comprising the distance elements.

FIG. 5A shows a schematic, three-dimensional side view of an assembly comprising a pipette tip extension 1, a pipette tip 12, and distance elements 9. In the embodiment shown, the distance elements 9 are provided by the pipette tip extension 1. The pipette tip extension 1 is attached to the distal end 30 of the pipette tip 12. The pipette tip 12 used is in this case a disposable pipette tip 12 which comprises at the proximal section 35 reinforcement bars, which are known in the art to provide a stabilizing effect when a disposable pipette tip 12 is attached for example to a pipette 22 of a liquid handling workstation 25.

The pipette tip extension 1 used corresponds to a pipette tip extension essentially described in FIGS. 1A to 1D, comprising three distance elements 9 which are configures as bars which extend from the proximal end 2 of the pipette tip extension 1 continuously towards the distal end 2, ending with an offset towards the distal end 3.

The surface of each elongated bar which faces towards the medial axis 11 function as a stop surface 10 for the inserted pipette tip 12; all stop surfaces 10 together form a “common" stop surface of the pipette tip extension 1 which define the position of the pipette tip 12 within the pipette tip extension 1.

By means of the distance elements 9, parts of the inner cavity 7 of the pipette tip extension 1 are preserved. These parts function as fluid uptake area, which can be filled with fluid or liquid from the pipette tip 12 when the dispense aperture 14 of the pipette tip extension 1 is closed. The distance elements 9 further function in this embodiment of the pipette tip extension 1 as means to constrict the insertion of the pipette tip 12 within the pipette tip extension 1. This ensures that a gap is formed between the distal end 30 of the pipette tip 12 and the distal end of the pipette tip extension 1. When the dispense aperture 14 of the pipette tip extension is then closed by placing the pipette tip extension 1 with its distal end 3 onto a suitable surface, liquid from the pipette tip 12 may be moved via the gap into the remaining cavity between the pipette tip 12 and the pipette tip extension 1.

FIG. 5B is a schematic sectional drawing through the assembly shown in FIG. 5A, based on the sectional plane A-A as indicated. The distance bar on the right side is shown in a cut off, while a part of the fluid uptake area 31 is visible on the left side. The fluid path from inner cavity 38 of the pipette tip 12 via the gap between the distal end 30 of the pipette tip 12 and the distal end 3 of the pipette tip extension to the part of the inner cavity 7 of the pipette tip extension 1, which is not occupied by the pipette tip 12, is particularly visible here. This unoccupied part of the inner cavity 7 together with the gap form the fluid uptake area 31.

The fluid uptake area 31 is in fluid connection with the inner cavity 38 of the pipette tip 12 via the distal end 30 of the pipette tip 12 and is additionally in fluid connection with the surrounding atmosphere at the proximal end 2 of the pipette tip extension 1. This ensures that, when the assembly is placed onto a surface 19 and the dispense aperture 14 of the pipette tip extension is closed by the surface and/or a tissue placed thereon, a liquid 20 may be moved between the inner cavity 38 of the pipette tip 12 and the inner cavity 7 of the pipette tip extension. This also ensures that the liquid 20 which is moved continuously contacts the surface or, if a tissue or tissue section is placed thereon, continuously contacts the tissue. See also FIGS. 7 and 8. Depending on the liquid 20 which is used, a reaction may be caused on the surface or on the tissue at the very restricted area below the dispense aperture 14 of the pipette tip extension 1, and as it described in the context of FIG. 9.

Figure 5C:
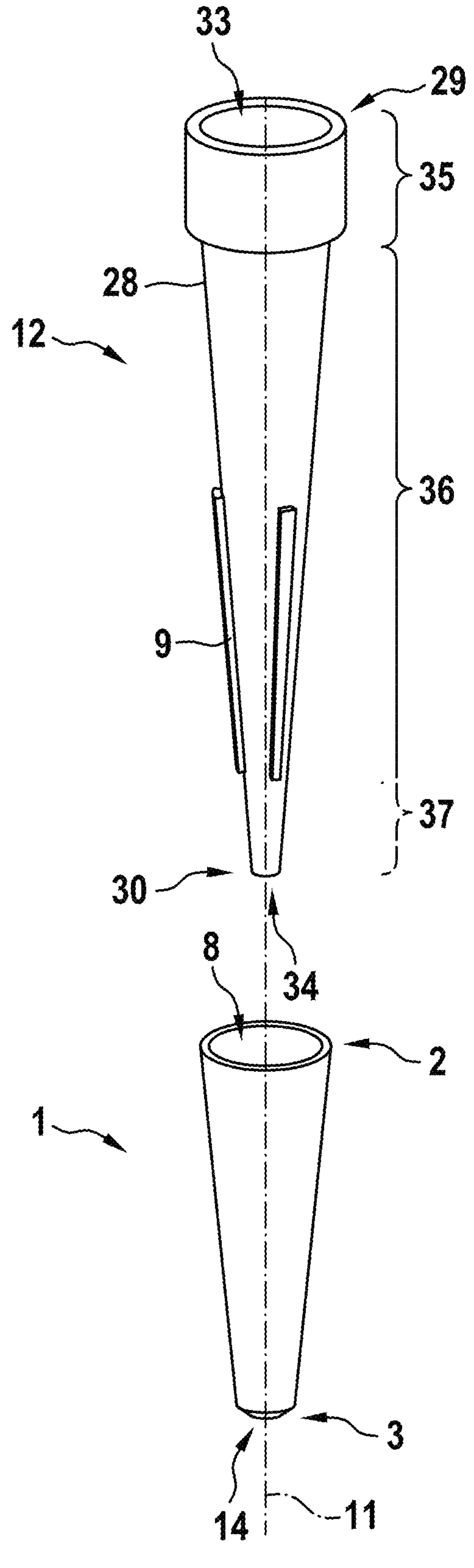
FIG. 5C a schematic, three-dimensional side view of the components of an embodiment of an assembly, with the pipette tip comprising distance elements; p FIG. 5D a schematic, three-dimensional side view of the components of a further embodiment of an assembly, with the distance elements being provided by a separate insert.

FIG. 5C shows alternative embodiments of three components of an assembly in a three-dimensional view. Here, the pipette tip 12 comprises the distance elements 9. Shown is in this case a disposable pipette tip 12 which basic structure is known in the art. The pipette tip 12 comprises a proximal end 29 with a proximal aperture 33 for attachment to a pipette, a distal end 30 with a distal aperture 34 as an inlet/outlet for aspirated and/or dispensed liquid 20, and an exterior wall 28 extending between the proximal end 29 and distal end 30.

The pipette tip 12 comprises a reinforced proximal section 35 at the proximal end 29 and around a proximal aperture 33. The reinforcement shall prevent deformations of the pipette tip 12 when it is attached with the proximal aperture 33 to a pipette for aspiration and/or dispensation. The pipette tip 12 here comprises for reinforcement a circumferential thickening at the proximal end 29, wherein the region of reinforcement along a longitudinal direction is named as the proximal section 35. Other or additional reinforcement structures are also possible, for example reinforcement ribs.

The section adjacent to the proximal section 35 with reinforcement structures is named here as an intermediate section 36, followed by a distal section 37. Intermediate section 36 and distal section 36 are the sections of the pipette tip 12 for accommodating aspirated liquid. Their geometry may vary depending on different requirements for example of the volume and/or type of liquid or requirements of the pipetting device used. The pipette tip shown here continuously tapers over the intermediate section 36 and the distal section 38 up to the distal end 30.

The pipette tip 12 comprises a multitude of distance elements 9 which are configured as elongated bars. Visible are two bars, which extend at the intermediate section 36 and distal section 37 in a direction from the proximal end 29 towards the distal end 30 of the pipette tip 12. The distance elements 9 are positioned at the outer side of the pipette tip 12. Their position on the pipette tip 12 is chosen so that the distance elements 9 are abutted by the inner side 6 of a pipette tip extension 1 when the pipette tip extension 1 is attached to the distal end 30 of the pipette tip 12, and establish a fluid uptake area 31 between the outer side of the pipette tip 12 and the inner side of the pipette tip extension 1.

Also in the embodiment shown, it might be sufficient that the distance elements 9 inherently function as stopper for the pipette tip 12 when it is inserted into the pipette tip extension 1. In this case, the distance elements 9 are dimensioned so that the pipette tip 12 cannot be forced significantly further into the pipette tip extension 1 when the distance elements abut the inner side 6 of the pipette tip extension 1. Thus, the distance elements 9 are dimensioned so that a frictional connection is generated when the distal end 30 of the pipette tip 12 has not yet reached the distal end 3 of the pipette tip extension 1, and so that the generation of the gap between the distal end 30 of the pipette tip 12 and the distal end of the pipette tip extension 1 is allowed upon assembly. Additional constriction elements 13 as described herein may be provided in addition or alternatively, provided by the pipette tip extension 1 and/or by the pipette tip 12.

Figure 5D:
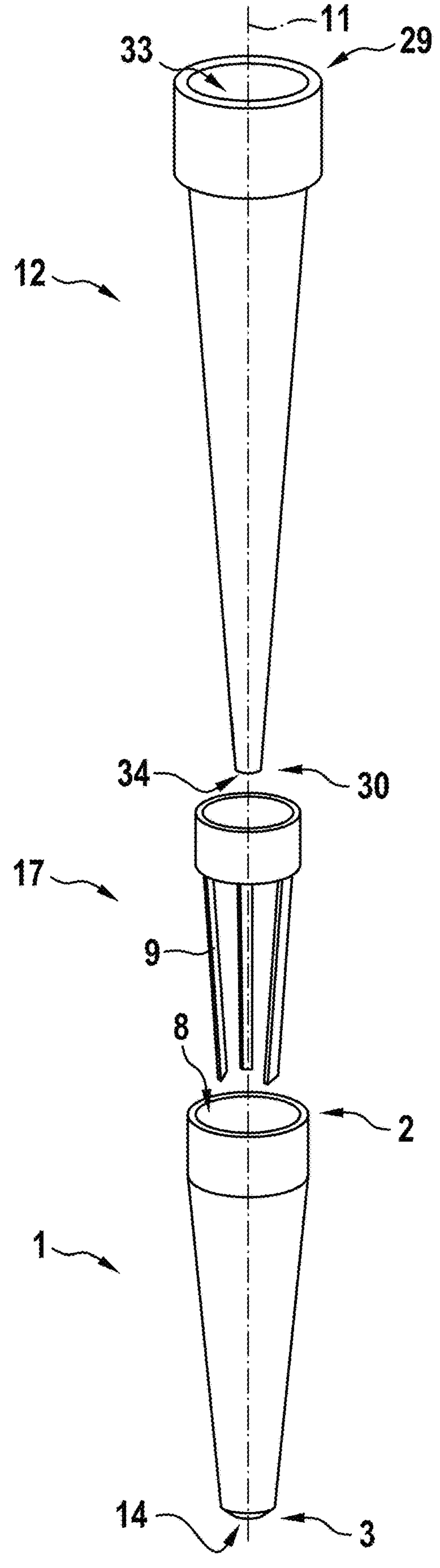

FIG. 5D shows schematically a three-dimensional side view of a further alternative embodiment of three components of an assembly. The assembly comprises also a pipette tip extension 1, distance elements 9, and a pipette tip 1. In this case, the distance elements 9 are provided by an insert 17. This insert is adapted to be arranged between a pipette tip extension 1 and a pipette tip 12 and is configured to establish a fluid uptake area between the pipette tip 12 and the pipette tip extension 1 when assembled. The insert shown comprises three distance elements 9 which are connected here by a connecting ring 39. In this case, the connecting ring 39 is positioned at the proximal end of the insert 17. The connecting ring 39 is further configured to be placed onto the proximal end 2 of the pipette tip extension 1 while ensuring the fluid connection of the space between the distance elements 9 and the surrounding atmosphere.

Figure 6A:
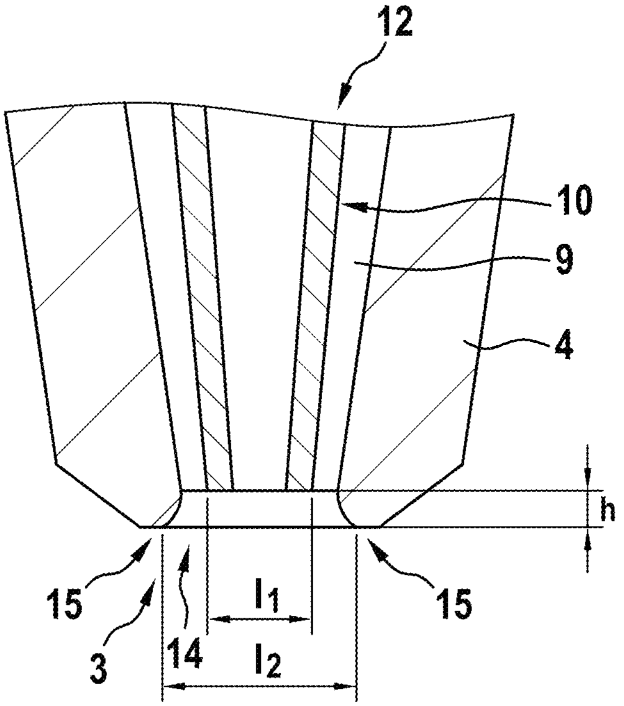
FIG. 6A a schematic view of a distal end of an embodiment of a pipette tip extension where the distance element functions as constriction element for controlling the insertion depth of a pipette tip.

FIG. 6A shows in a higher magnification a schematic sectional view of the situation at the distal end of a pipette tip extension 1 according to FIG. 1A. In this embodiment, the distance elements 9 are provided by the pipette tip extension 1 and serve as constriction element 13 for controlling the insertion depth of a pipette tip. The pipette tip 12 is shown as being already inserted into the pipette tip extension 1. The outer side of the pipette tip 12 abuts the corresponding stop surfaces 10 of the distance elements 9. The distance elements 9 are configured that the pipette tip 12 is stopped during insertion when its distal end 30 has not yet reached the distal end 3 of the pipette tip extension, so that a gap of a gap height h is formed. In this case, the distance elements 9 define—based on its dimensions—in the region of the distal end 3 a smallest lateral extension $I_1$ of the inner cavity 7 of the pipette tip extension 1. This smallest lateral extension I1 may alone constrict the insertion of a pipette tip 12, or in combination with for example the dimensions of the remaining part of the distance element(s) 9.

In addition, the lateral extension 12 of the dispense aperture 14 is shown. This lateral extension $I_2$ is essentially defined by the dimensions of the exterior wall 4 at the distal end 3 of the pipette tip extension 1. The size of the lateral extension $I_2$ of the dispense aperture may vary, as will be defined in the context of FIGS. 6C and 6D. For example, it is possible to provide different pipette tip extensions 1 having varying standard dispense apertures 14, or it may be possible to provide a pipette tip extension 1 with interchangeable distal ends 3, and each of such interchangeable distal end 3 may have a differing dispense aperture 14.

Figure 6B:
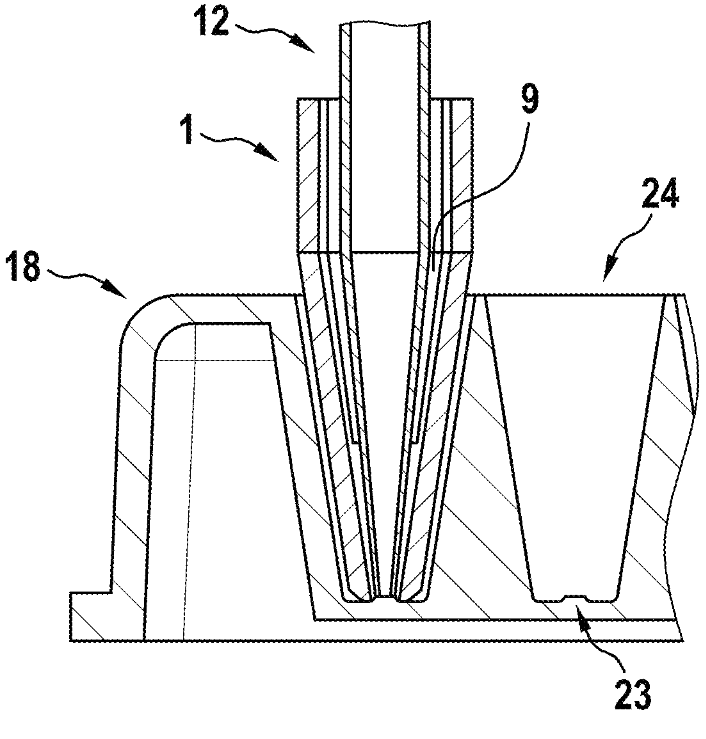
FIG. 6B a schematic view of an embodiment of a pipette tip extension with an pipette tip being inserted into the pipette tip extension, with a constriction element being provided by a carrier.

FIG. 6B shows an assembly which comprises a pipette tip extension 1, the pipette tip extension comprising distance elements 9, and a pipette tip 12 being inserted into the pipette tip extension 1. The pipette tip extension 1 is positioned within an accommodation site 24 of a carrier 18. The carrier 18 is configured for storing one or more of the pipette tip extensions. In this example, the insertion depth of the pipette tip 12 is controlled by a constriction element 13 which is provided by the carrier 18.

FIG. 6B shows in a schematic view an alternative embodiment of a pipette tip extension 1, together with an inserted pipette tip 12 and a carrier 18. The pipette tip extension 1 comprises distance elements 9, two of which may be seen in this sectional view, but are not sectioned themselves but rather shown transversely from the front. In this embodiment, the distance elements 9 extend less far towards the distal end 3 of the pipette tip extension 1 than in the embodiments described before. These distance elements 9 are in particular configured to provide a safe seat of the pipette tip 12 within the pipette tip extension 1 when the pipette tip abuts the distance elements 9. Preferably, the seat of the pipette tip 12 within the pipette tip extension 1 is provided by a friction-fit connection. It is not foreseen that the distance elements 9 provide a constriction function to regulate the insertion depth of the pipette tip 12.

One pipette tip extension 1 is shown to be inserted into a complementary accommodation site 24 of a carrier 18. Shown are in FIG. 6B 2 accommodation sites 24 in a partial view. The carrier 18 is primarily configured for storing one or more of the pipette tip extensions 1. For this, also the carrier 18 comprises one or more accommodation sites 24, with each accommodation site 24 being adapted in their shape and dimension to receive one pipette tip extension 1. A pipette tip extension 1 inserted into an accommodation site 24 is presented by the carrier 18 in a manner so that it may be picked up for example automatically by a pipette tip 12 coupled to a pipette 22, for example of a liquid handling workstation 25. It is possible that one carrier 18 comprises for example one or more rows of 8 or 12 accommodation sites 24.

The carrier 18 shown additionally comprises a stopper 23, which functions as constriction element 13 with which the insertion depth of a pipette tip 12 into the pipette tip extension 1 is controlled. The stopper 23 is arranged in each of case at a bottom of the accommodation site 24. Thus, in this embodiment, the constriction element 13 is provided by the carrier 18 and is configured as a protrusion, which reaches through the dispense aperture 14 of a pipette tip extension 1 inserted into the respective accommodation site 24. A pipette tip 12 which is inserted into the pipette tip extension 1 of the respective accommodation site 24 comes to a stop when its distal end 30 abuts the stopper 23 of the carrier 18. This situation is shown for the left accommodation site 24, while for a better overview of the stopper 23, the right accommodation site 24 is shown free. Therefore, the stopper 23 defines the end position of the pipette tip 12 in view of the height. When in a following step the pipette tip 12 together with the attached pipette tip extension 1 is moved away from the carrier 18, the pipette tip 12 remains in the end position, as it is hold therein via friction.

Figure 6C:
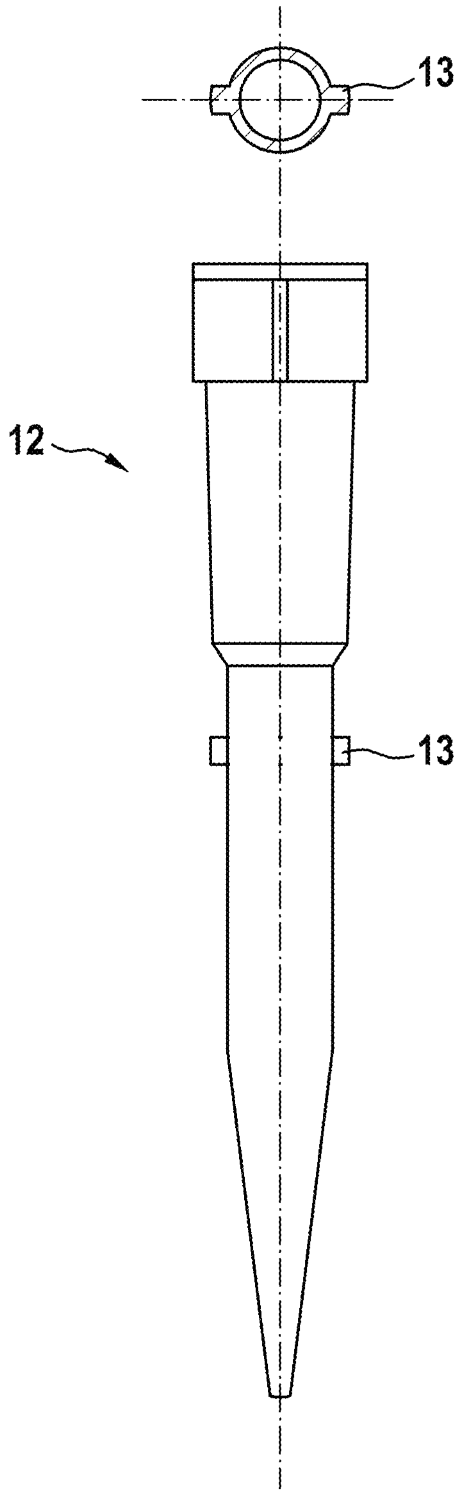
FIG. 6C a schematic view of an exemplary embodiment with a pipette tip comprising a constriction element.

FIG. 6C shows in a three-dimensional side view schematically another exemplary embodiment where a constriction element 13 is provided by a pipette tip 12. In the embodiment shown, the pipette tip comprises a shoulder which function as a constriction element 13, as the shoulder is configured to abut the proximal end of the pipette tip extension 1. The shoulder is not circumferential in a direction orthogonally to the z-direction/to the medial axis of the pipette tip 12, to allow pressure equalization when a liquid 20 is moved between the pipette tip 12 and the pipette tip extension 1. The shoulder may be continuous circumferential if the proximal end 2 of a pipette tip extension 1 has for example a discontinuous surface, for example a notched surface to enable air to escape. The shoulder may be a simple, discrete protrusion of the exterior wall 28 of the pipette tip 12, or may be configured as rib-like bars. Exemplarily, a top view onto a pipette tip 12 comprising such a shoulder is shown above the side view. However, it is also possible that for example the insert 17 comprises a constriction element for restricting the insertion depth of a pipette tip 12, when an insert 17 is used to provide one or more distance elements 9.

Figure 6D:
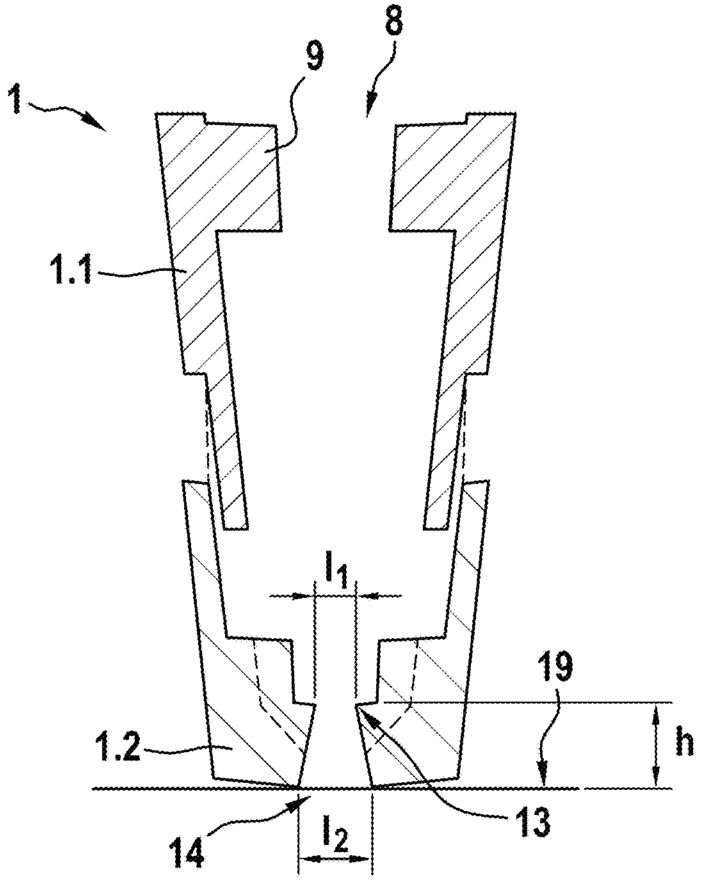
FIG. 6D a schematic view of an embodiment of a multi-part pipette tip extension, with the lower, second part providing a constriction element.
Figure 6E:
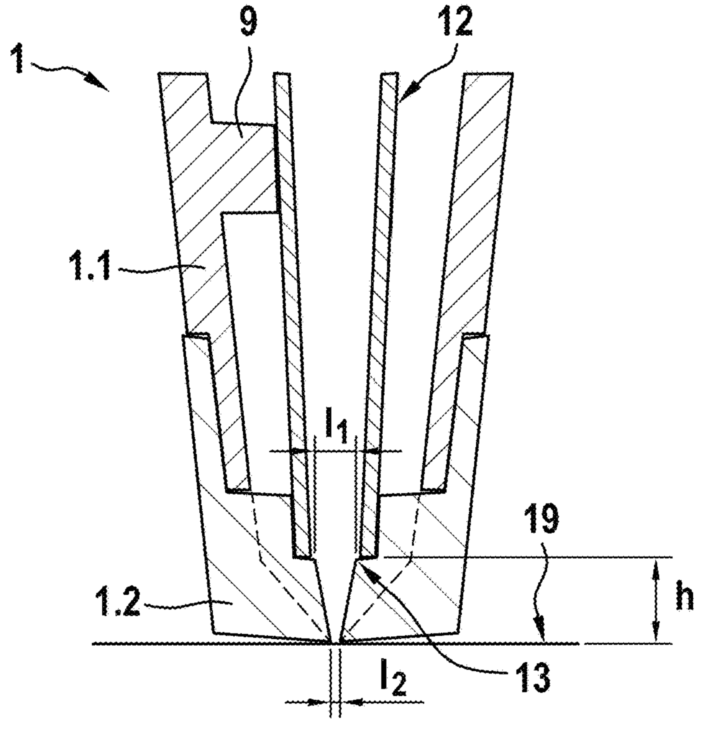
FIG. 6E the pipette tip extension of FIG. 6C in an assembled state.

FIG. 6D shows a schematic sectional view of a pipette tip extension 1, which is configured as a two-part piece, comprising a first, upper part 1.1 and a second, lower part 1.2. In this embodiment, the first part 1.1 comprises in particular the distance elements 9 and the reception aperture 8, while the second part 1.2, which is the lower part here, comprises the dispense aperture 14 and the constriction element 13. In this case, the constriction element 13 is a thickening of the exterior wall 4 in the distal region. A pipette tip 12 which is inserted, as shown in FIG. 6E, abuts the constriction element 13, and the further insertion of the pipette tip 12 is prohibited. The second, lower part 1.2 in this case is provided as an attachable piece and may be replaced by another lower part 1.2 which comprises for example another lateral extension or diameter $I_2$ of the dispense aperture 14, if this is for example required for a certain area of interest.

In particular when comparing the pipette tip extensions 1 shown in FIGS. 6C and 6D, this principle of an exchangeable use of the lower part 1.2 is visible. While the constriction element 13 remains the same in view of its structure, the lateral extension $I_2$ of the dispense aperture 14 of the lower part 1.2 of the pipette tip extension 1 shown in FIG. 6D is remarkable smaller than the lateral extension $I_2$ of the dispense aperture 14 of the pipette tip extension 1 shown in FIG. 6C.

Figure 7:
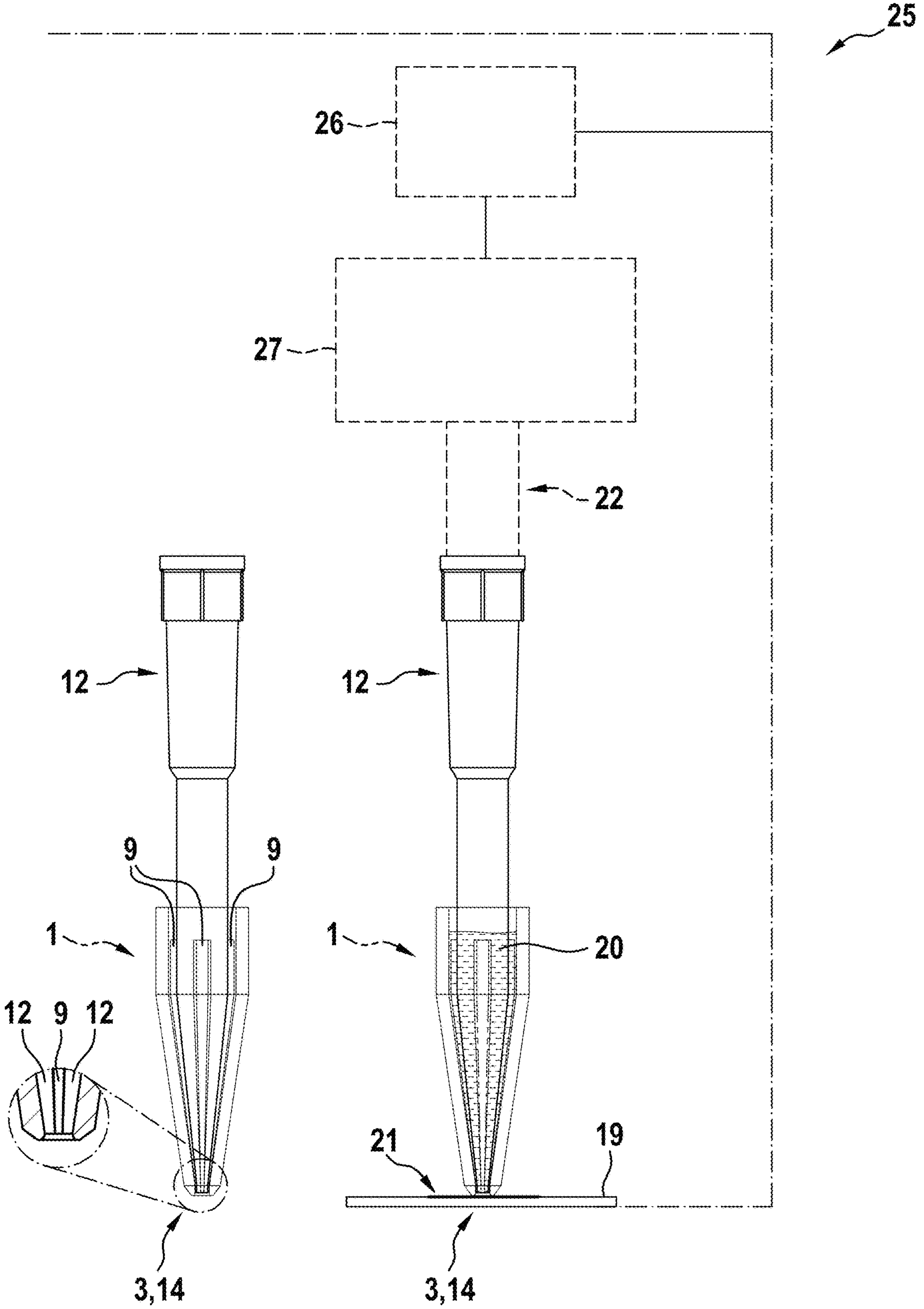
FIG. 7 two identical pipette tip extensions of an embodiment with a dispense aperture and each with an inserted disposable pipette tip, the left pipette tip extension being not yet filled with a fluid, the right pipette tip extension being operatively connected to a liquid handling workstation and filled with a fluid after having been placed onto a surface providing a sample section and after fluid has been dispensed out of the disposable pipette tip.

FIG. 7 shows in a schematic overview drawing two identical pipette tip extensions 1, each with a pipette tip 12 inserted into the inner cavity 7. In this embodiment, the pipette tip extension 1 comprises at least three distance elements 9, which are configured as elongated bars. The bars are abutted by the inserted pipette tip 12 at their stop surfaces, which also restrict at least partially the insert depth of the pipette tip 12. The gap between the distal end 30 of the pipette tip and the distal end 3 of the pipette tip extension is highlighted in the higher magnification of the situation for the left assembly of pipette tip extension 1 and pipette tip 12.

The corresponding assembly on the right side is shown to be placed onto a sample section 21, which is provided in this case by the surface 19 of a microscope slide. The distal end 3 of the pipette tip extension 1 is essentially sealed towards the surrounding atmosphere by the sample section 21 and/or the surface 19, so that the formed gap fluidly connects the inner cavity of the pipette tip 12 with the fluid uptake area 31 between the distance elements 9, the inner side 6 of the exterior wall 4, and the outer side of the pipette tip 12. A liquid 20 is present in the fluid uptake area 31, including in the gap. The liquid 20 reaches above the proximal end of the distance elements 9 and is in fluid connection with the surrounding atmosphere at the proximal end 2 of the pipette tip extension 1. This open configuration allows the movement of the liquid between the pipette tip 12 and the pipette tip extension 1 when the dispense aperture 14 of the pipette tip extension is sealed.

The pipette tip 12 of the assembly is shown to be attached to a pipette 22 of a liquid handling workstation 25. The pipette 22 is part of a pipetting head 27 of the liquid handling workstation 25, which in turn is under the control of a controller. In this case, the movement of the pipette tip 12 into the pipette tip extension 1, and the friction fit connection, as well as the movement to a microscope slide, the positioning therein, and the pipetting steps such as dispensation steps and/or aspiration steps may be carried out under the control of the liquid handling workstation 25.

Figure 8:
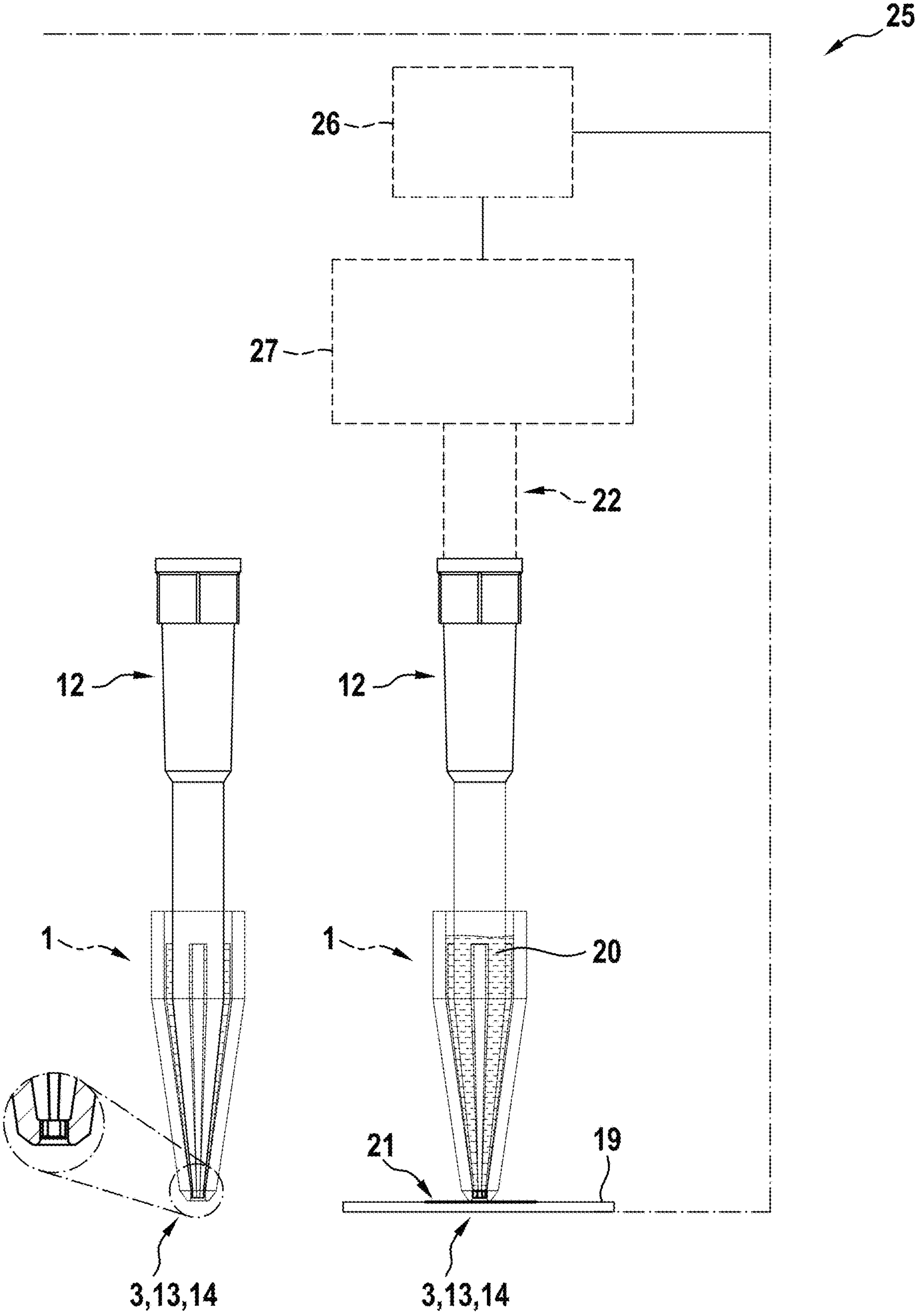
FIG. 8 two identical pipette tip extensions of another embodiment, with a dispense aperture, a sieve-like constriction element and an inserted disposable pipette tip, the left pipette tip extension being not yet filled with a fluid, the right pipette tip extension being operatively connected to a liquid handling workstation and filled with a fluid after having been placed onto a surface providing a sample section and after fluid has been dispensed out of the disposable pipette tip.

FIG. 8 shows in a schematically overview drawing two identical pipette tip extensions 1 in a further embodiment, each pipette tip extension 1 with a pipette tip 12 inserted into the inner cavity 7. In this embodiment, the pipette tip extension 1 comprises at least three distance elements 9, which are configured as elongated bars, and which are abutted by the inserted pipette tip 12 at their stop surfaces. Additionally, the pipette tip extension 1 of this embodiment comprises as a constriction element 13 support bars 16 which form a sieve-like structure at the distal end 3, and which in this case restricts the insert depth of the pipette tip 12 and allows the formation of the gap. This gap between the distal end 30 of the pipette tip and the distal end 3 of the pipette tip extension is also here highlighted in the higher magnification of the situation for the left assembly of pipette tip extension 1 and pipette tip 12. As can be seen, also in this embodiment, the gap provides a fluid connection the inner cavity of the pipette tip 12 with the fluid uptake area 31 between the distance elements 9, the inner side 6 of the exterior wall 4, and the outer side of the pipette tip 12.

The assembly on the right side is—in analogy to the right assembly shown in FIG. 7—also sealed by a surface 19 of a microscope slide and the sample section 21 positioned thereon. Also in analogy to FIG. 7, the pipette tip extension 1 is filled with a liquid 20 in its fluid uptake area 31. The connection to the corresponding elements of a liquid handling workstation 25 may analogously be taken from the description of FIG. 7.

Figure 9:
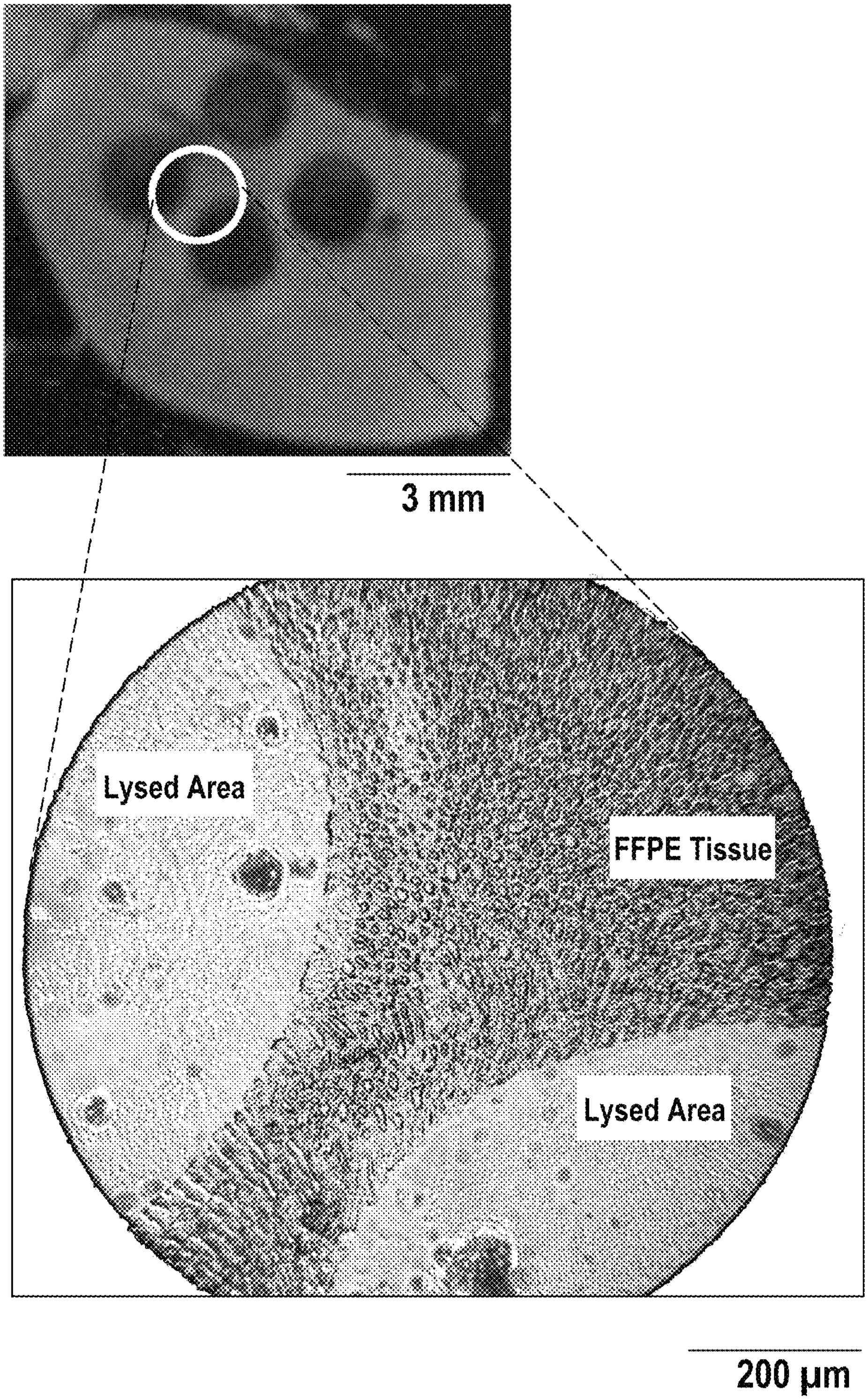
FIG. 9 a microscope image of a tissue section immobilized on a microscope slide, with four areas of interest treated specifically by use of a pipette tip extension according to the invention and an enlargement image showing two treated areas (lysed area) which are surrounded by untreated tissue.

FIG. 9 shows a microscope image of a formalin fixed paraffin embedded (FFPE) section of a mouse kidney purchased from Amsbio, LLC, Part Number MP-901 in an overview, and a higher magnification of a selected area below. The corresponding scale bars are given for each image.

An assembly as shown in FIG. 5A has been used for the treatment of the tissue section. The slide comprising the tissue section has been treated according to the following protocol:

Placing the slide onto a heated metal block, which is preheated to 65° C.

Aspirating 50 μl of a nucleic acid extraction solution (Part Number QE09050, Lucigen Corporation), using a 200 μl standard disposable pipette tip of Tecan (part number 30057814, Tecan Systems, Inc.) has this been done with a liquid handling device (Cavro® Omni Flex).

Assembling the pipette tip with the pipette tip extension. Lowering the assembly onto the tissue section, thereby closing the dispense aperture of the pipette tip extension, and performing the following liquid treatment:

1. Dispensing 25 μl from the pipette tip into the fluid uptake area of the assembly, thereby moving the liquid over the tissue section.
2. Holding liquid over the tissue section and in the fluid uptake area for 30 sec.
3. Dispense 20 μl from the pipette tip into the fluid uptake area, wait 500 msec.
4. Aspirate 20 μl back into the pipette tip, wait 500 msec.
5. Repeat steps 3. and 4. for five times.
6. Repeat steps 2. to 5. for four times.

After this treatment, aspirate the full liquid volume back into the pipette tip.

Raising the pipette tip in the assembly from the tissue section.

Repeating the liquid treatment on three additional areas on the tissue section.

The upper microscope image shows in an overview the tissue section after the liquid treatments as described above. The four areas which have been treated are visible as black circles. The lower image shows the area within the white circle in a higher magnification. In both images, clear boarders have been generated between the untreated tissue areas, indicated as "FFPE Tissue", and the treated areas, indicated as "Lysed Area". From the higher magnification image, it may be taken that the liquid treatment has caused changes on the surface. It may be concluded that the liquid treatment has caused tissue or components of the tissue being extracted from the paraffin embedding into the treating liquid.

The remaining structure which may be seen on the treated areas may be—aside the glass of the microscope slide—paraffin residue, unremoved cellular debris and/or solids remaining after the evaporation of the extraction liquid.

FIG. 9 shows the result of an exemplary method carried out by way of example with one possible embodiment of the pipette tip extension used in an assembly with a pipette tip. Other embodiments may be used depending on the desired application. The protocol may vary depending on the goal of the analysis, for example.

Figure 10:
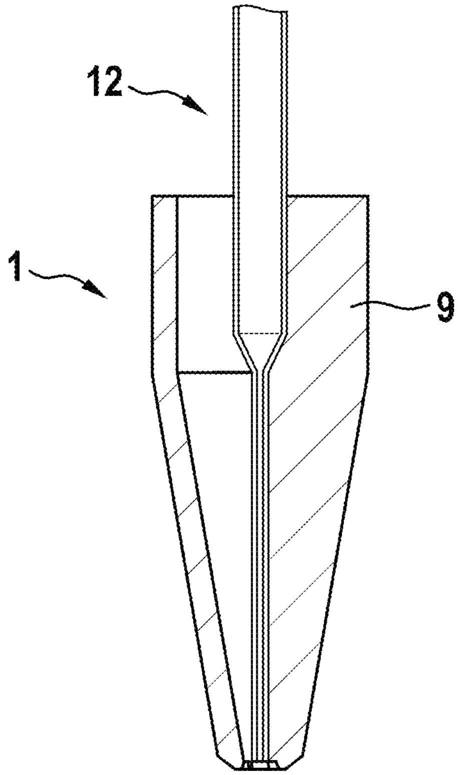
FIG. 10 a schematic drawing of an embodiment of a pipette tip extension comprising distance elements and an inserted pipette tip, which is a reusable pipette tip.

FIG. 10 shows a schematic drawing of cross sectional view of a pipette tip extension 1 comprising at least one distance elements 9, which is adapted to position a fixed pipette tip 12 within the pipette tip extension 1. The fixed pipette tip 12 is shown here as having the typical shape, with an elongated thin distal part which is abutted by the distance element 9 shown on the right side as a side cut. Independently of whether for example a disposable pipette tip or a fixed tip is used, the pipette tip extension 1 is adapted in its configuration to provide a stable and safe seat. The insertion depth may additionally be controlled by a constriction element 13 described before, or for example simply by the force used to insert the pipette tip 12.

FIGS. 11A to 11D shows schematic cross sections of different variants of a pipette tip extension 1. The variants differ in respect to the outer shape given by the exterior wall 4, the number, dimensions and configurations of the distance elements 9, and their effect onto the size and position of the fluid uptake area 31 and the pipette tip hosting area 32. The medial axis 11 of the pipette tip extension 1 is shown by chain lines.

The pipette tip hosting area 32 is understood here as the area or space within the inner cavity 7 of the pipette tip extension 1 which will be occupied by a pipette tip 12 when the pipette tip extension 1 is attached to pipette tip 12 having a an essentially circular cross section, and the pipette tip 12 abuts the distance elements 9. The potential position of the pipette tip 12 to be inserted or its outer boarders are indicated as circular boarder of the pipette tip hosting area 32.

The fluid uptake area 31 is shown here as a shaded area which shall indicate that this area may be filled with a liquid 20, when a pipette tip 12 is inserted and the dispense aperture 14 is closed for example by a surface 19. As described and shown before, the fluid uptake area 31, or the inner cavity 7 of the pipette tip extension 1, is not covered or closed otherwise at the proximal end of the pipette tip extension 1. This allows a pressure compensation when a liquid is moved between an inserted pipette tip 12 and the remaining cavity 7 or fluid uptake area 31. The liquid may flood the distance elements 9 when they are for example arranged with an offset to the proximal end of the pipette tip extension 1.

Figure 11A:
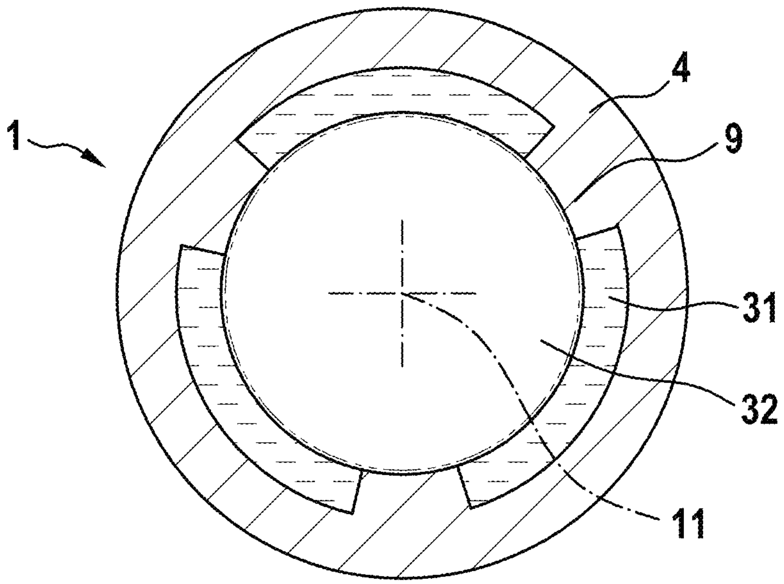
FIG. 11A-D schematic views of the proximal end of various embodiments of pipette tip extensions showing different variants of outer shapes and different possible positions of the pipette tip hosting area and the fluid uptake area.

FIG. 11A shows an essentially concentric arrangement of the pipette tip hosting area 32 within the inner cavity 7 of the pipette tip extension 1. The cross section of the pipette tip extension 1 has a circular shape, and three distance elements 9 are distributed regularly over the perimeter of the inner side 6. Each distance element 9 is configured as a trapezoidal bar formed as protrusion of the exterior wall 4, each bar having the essentially same configuration. The area which may take up a liquid 20, namely the fluid uptake area 31, is confined by the inner side 6 of the exterior wall 4, the distance elements 9 and, in the assembly, the outer side of the pipette tip 12.

Figure 11B:
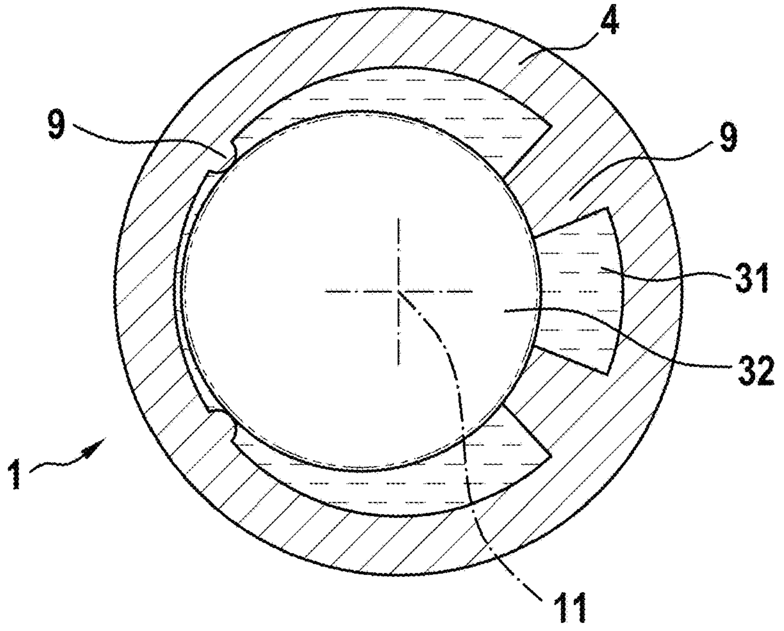

FIG. 11B shows an acentric arrangement of the pipette tip hosting area 32 within the inner cavity 7 of the pipette tip extension 1. The cross section of the pipette tip extension 1 has a circular shape. Four distance elements 9 are provided which are distributed regularly over the perimeter of the inner side 6 of the exterior wall 4. Two distance elements 9 are exemplarily shown as being of a comparable trapezoidal shape, while the two remaining distance elements 9 have a semi-circular shape, which protrude less far into the inner cavity 6 than the trapezoidal elements. By this asymmetric configuration of the distance elements 9, a pipette tip 12 will be positioned off-centre with respect to its own medial axis, and the resulting fluid uptake area 31 is distributed also asymmetrically within the inner cavity 7 of the pipette tip extension 1.

Figure 11C:
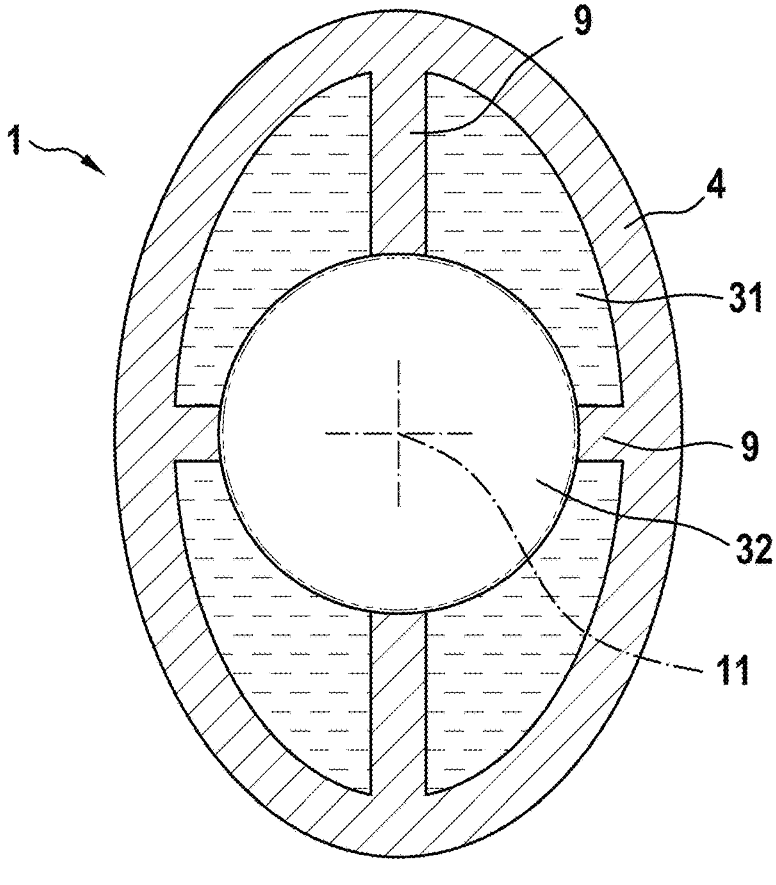

FIG. 11C shows a concentric arrangement of the pipette tip hosting area 32 within the inner cavity 7 of the pipette tip extension 1, the pipette tip extension 1 having an oval shaped cross section. Four distance elements 9, each configured as quadrangular bar, are provided which are distributed regularly over the perimeter of the inner side 6 of the exterior wall 4. The concentric position of the pipette tip 12 is enabled by the configuration of the distance elements 9, with two of the bars protruding further into the inner cavity 7 and towards the medial axis 11 than the other two bars, thereby counterbalancing the varying distances from the exterior wall 4 towards the medial axis 11. By adapting the depth of the distance elements 9 (see also FIG. 13C), the volume of the fluid uptake area 31 may be adapted as well.

Figure 11D:
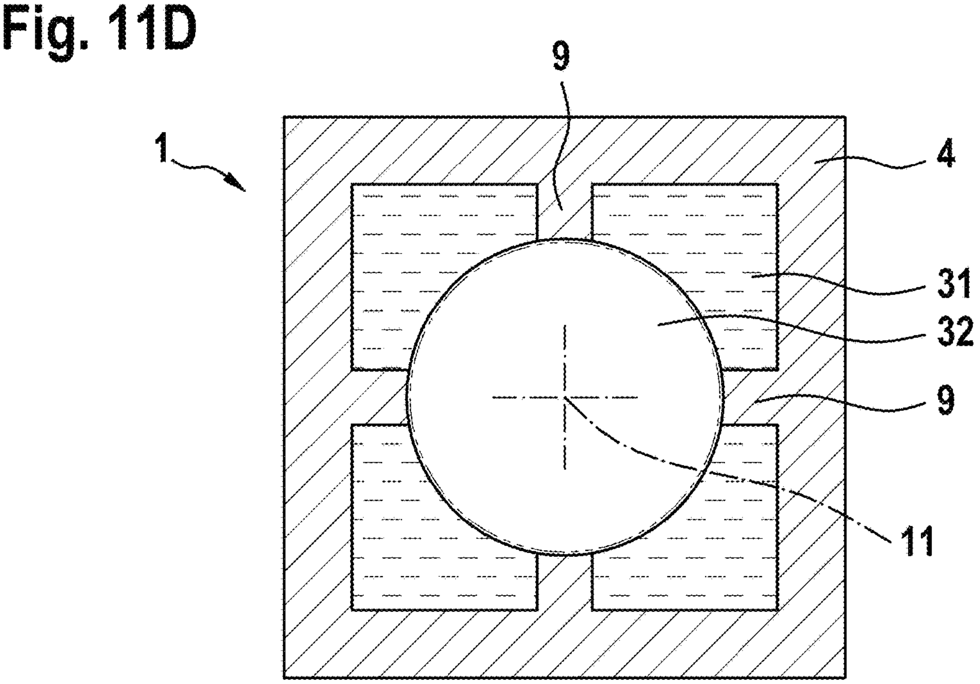

FIG. 11D shows a concentric arrangement of the pipette tip hosting area 32 within the inner cavity 7 of the pipette tip extension 1, the pipette tip extension 1 having a square shaped cross section. Four distance elements 9, each configured as quadrangular bar, are provided which are distributed regularly over the four inner sides 6 of the exterior wall 4. The concentric position of the pipette tip 12 is enabled by the configuration of the distance elements 9, with all bars protruding by the same length into the inner cavity 7 and towards the medial axis 11.

Figure 12A:
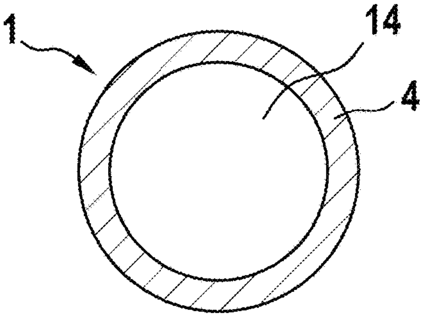
Figure 12B:
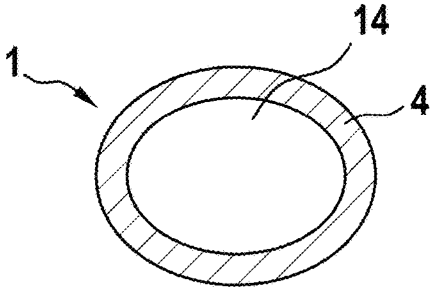
Figure 12C:
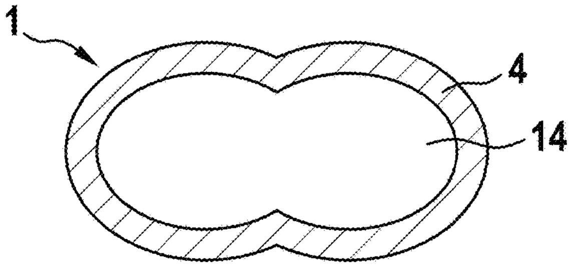
Figure 12D:
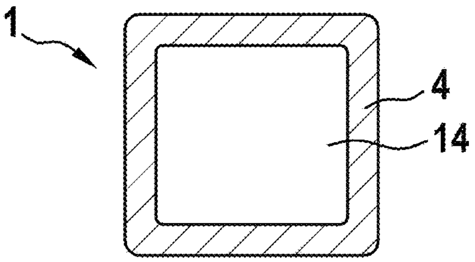
Figure 12E:
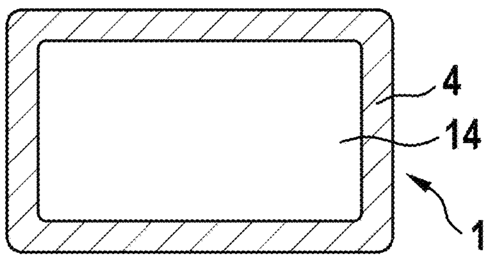
Figure 12F:
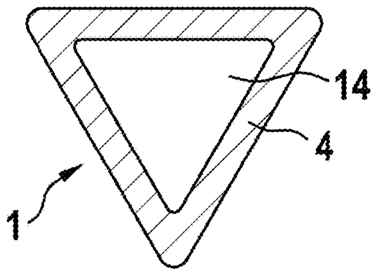
Figure 12G:
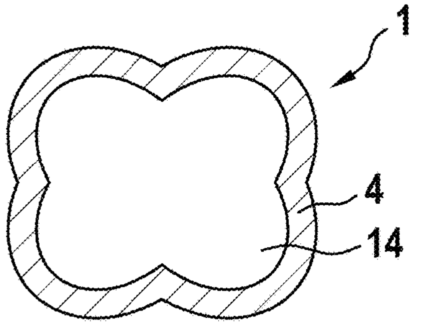
Figure 12H:
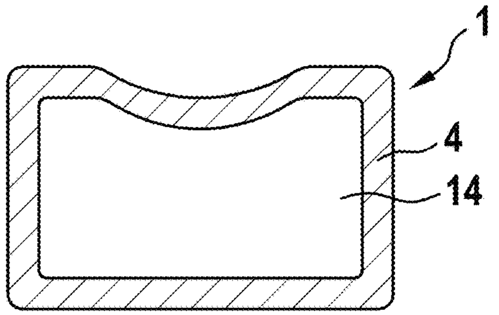
Figure 12I:
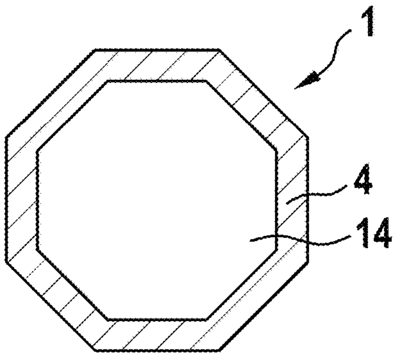

FIGS. 12A to I show exemplarily different shapes of the dispense aperture 14 formed by the exterior wall 4 of a pipette tip extension 1 in a cross-sectional view. Exemplarily shown are a circular cross section (FIG. 12A), an oval shaped cross section (FIG. 12B), a cross section with a double oval shape (FIG. 12C), a square (FIG. 12D) or quadrangular (FIG. 12E) cross section, a triangular cross section (FIG. 12F), a shamrock shaped cross section (FIG. 12G), a quadrangular shape with one (FIG. 12H) or more (not shown) indentations, or an octagonal cross section (FIG. 12I).

Figure 14:
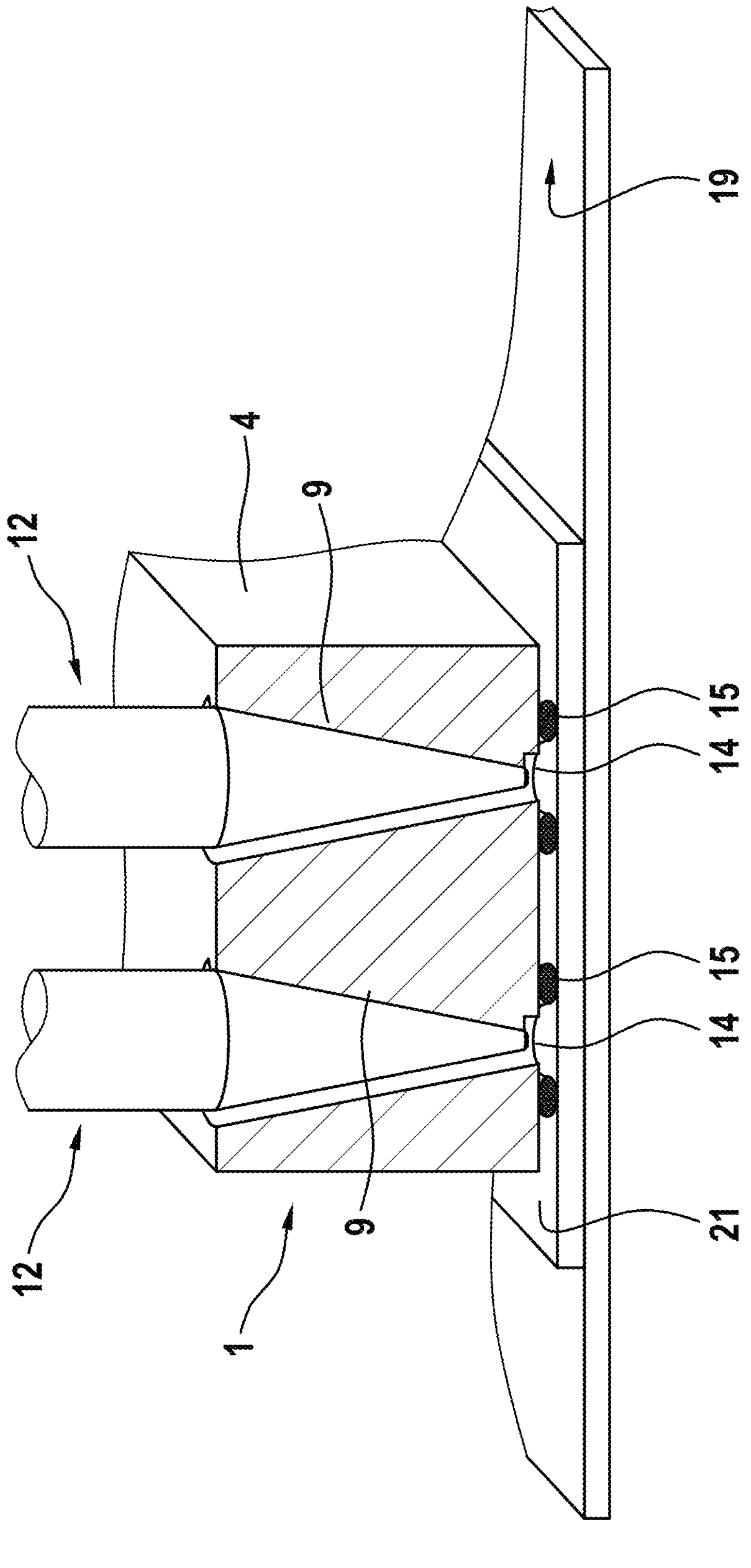

These Figures demonstrate that the shape of the dispense aperture 14 may be adapted to certain desired applications or sizes of envisaged areas of interest, for example to specific sections of different tissues. The shape may also be adapted for example to other requirements which may make a certain shape necessary of at least advantageous. For example, the double-oval shape may be desired if the pipette tip extension 1 is configures for taking up two pipette tips 12, as shown in FIG. 14. Other cross section may be possible which may have for example an asymmetrical shape, though they are not explicitly shown here.

Figure 13C:
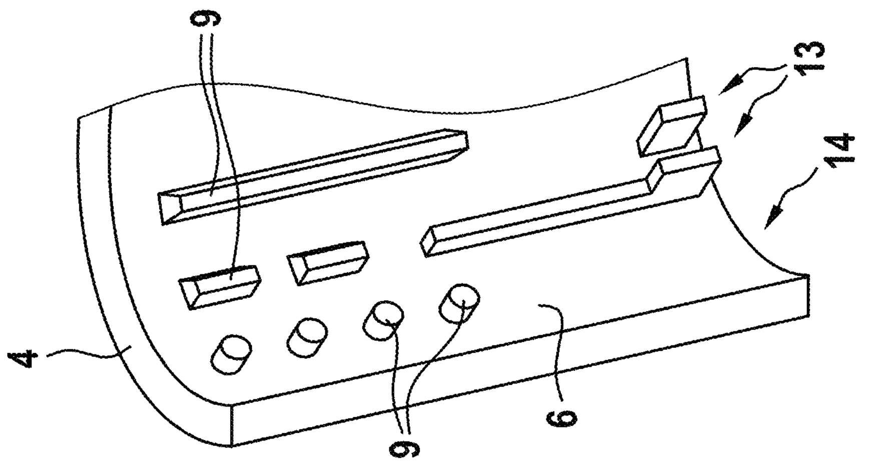
FIG. 13A-C schematic views of various embodiments of pipette tip extensions showing the inner side of the exterior wall, FIG. 14 a schematic sectional view of an embodiment of a pipette tip extension which is configured to accommodate two pipette tips for the treatment of a sample, FIG. 15 a schematic overview over an exemplary method of treating a sample with a liquid, FIG. 16 a schematic diagram of method steps for treating a sample, FIG. 17 a schematic diagram of further specified method steps for treating a sample, and FIG. 18 a schematic diagram of further specified, additional and optional method steps.
Figure 13B:
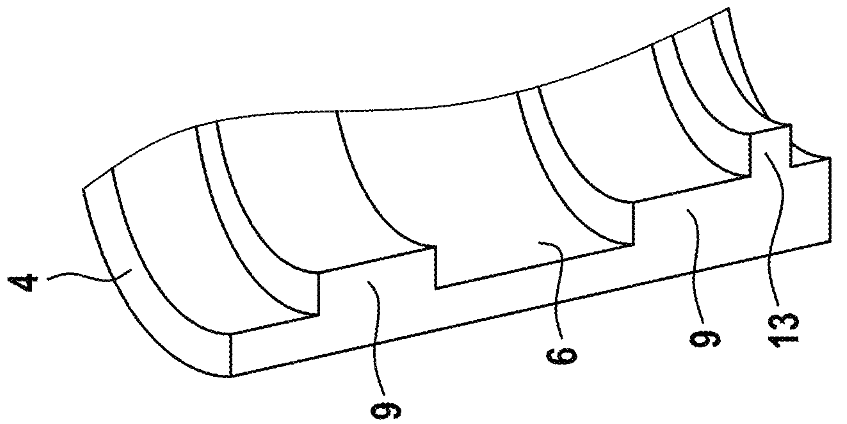
Figure 13A:
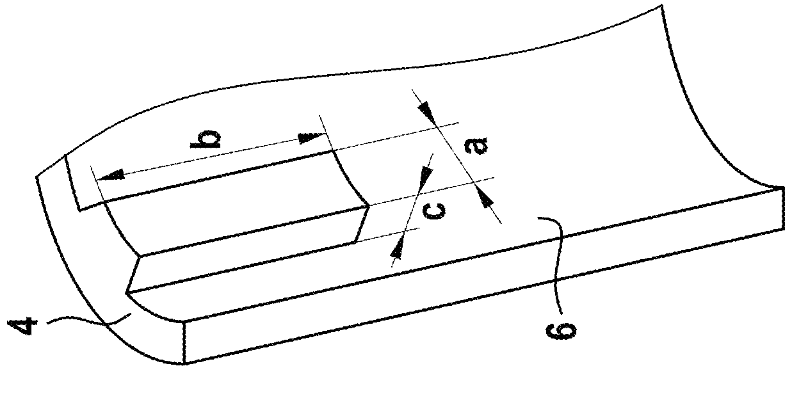

FIGS. 13A to 13C shows schematically views onto the inner side 6 of the exterior wall 4 of a pipette tip extension 1 and onto exemplarily presented, different embodiments of a distance elements 9.

FIG. 13A shows a distance element 9 which is configured as an elongated bar, and which is arranged flush with the proximal end of the exterior wall 4 of a pipette tip extension 1. The bar extends from the proximal end 2 towards the distal end 3, and has a width "a" which corresponds to its dimension along the perimeter of the inner side 6 of the exterior wall 4, it has a length "b" which corresponds to its longitudinal dimension, and it has a depth "c" by corresponds to its dimension by which it protrudes into the inner cavity 7 and towards a medial axis 11. The description of depth a, length b, and width c may be applied to the distance elements 9 also in general.

FIG. 13B shows an inner side 6 of the exterior wall 4 comprising two distance elements 9. The upper distance element 9 is arranged with an offset to the proximal end 2, and as a width which is greater than its length b. Though not assessable by this sectional view, the upper distance element 9 does not have a circumferential extension but leaves at least a part of the inner side 6 of the exterior wall 4 unoccupied to allow a fluid connection between the provided fluid uptake area 31 and the surrounding atmosphere at the proximal end 2 of the pipette tip extension 1. The lower distance element 9 is configured in analogy to the upper distance element 9, but additionally comprises at its distal end an additional protrusion towards the medial axis 11 of the pipette tip extension 1. This additional protrusion serves as a structure that can be abutted for the distal end 30 of a pipette tip 12 and restricts the insertion depth of the pipette tip 12 within the pipette tip extension 1. By this, the additional protrusion function as a constriction element 13 and contributes to the determination of the position of the pipette tip 12 within the inner cavity 7 of the pipette tip extension 1.

FIG. 13C shows schematically different configurations of a distance element 9. All distance elements 9 shown are arranged with an offset to the proximal end 2 of the peripheral wall 4. Shown are distance elements 9 which are configured as more or less elongated bars, or as cylindrical protrusions. It is possible to combine differently configured distance elements 9 to achieve a desired seat of a specific pipette tip 12 within the pipette tip extension 1. For example, a multitude of elongated bars may be arranged along the same line from the proximal end 2 towards the distal end 3. Such a distribution may particularly be advantageous for achieving a mixing effect of a liquid 20 with parts of dissolved substances from a treated tissue. Apart from simple elongated dimensions, also deviating forms such as snake-like extensions or other may be possible.

At the more distal section, additional constriction elements 13 for controlling the insertion depth of a pipette tip 12 are shown. On the left side, a distance bar is shown which comprises an additional protrusion at its distal end, as it is shown also in FIG. 13B. On the right side, a single constriction element 13 is shown which is a simple protrusion directly from the inner side 6 of the exterior wall 6, and which may equally provide a stopper or stop surface that can be abutted for the distal end 30 of a pipette tip 12.

The geometry of the inner gap which corresponds the fluid uptake area 31 may be adjusted by a respective adjustment of the geometry of the distance element(s) 9 used and also the geometry of the shape of the exterior wall 4. It might for example particularly desirable to minimize the fluid uptake area 31 when only smaller volumes of liquid 20 shall be used; in this case, special emphasis needs for the geometry on the distance element(s) to minimize potential fluid trapping effects.

FIG. 14 shows in a highly schematic presentation a pipette tip extension 1 which is configured to receive two pipette tips 12. In this exemplary embodiment, the pipette tip extension comprises a highly thickened exterior wall 4, and therein are provided two separate reception apertures 8 and two inner cavities 7, each inner cavity 7 comprises an individual pipette tip hosting area 32, which is occupied here by the respective pipette tips 12. In each cavity, the respective pipette tip 12 is spaced apart from the inner side 6 of the exterior wall 4 by a distance element 9. For each inner cavity 7, one of the distance elements 9 is seen and shown to be cut in the sectional view.

The pipette tip extension 1 comprises two additional seals 15 at the distal end 3. Each seal 15 surrounding one of the dispense apertures 14. In this configuration, a simultaneous treatment of adjacent areas on a sample is allowed, because each of the two pipette tips 12 may be used for treating an individual area on the sample. A further multiplication of pipette tip hosting areas 32 may be possible though not shown here.

Figure 15:
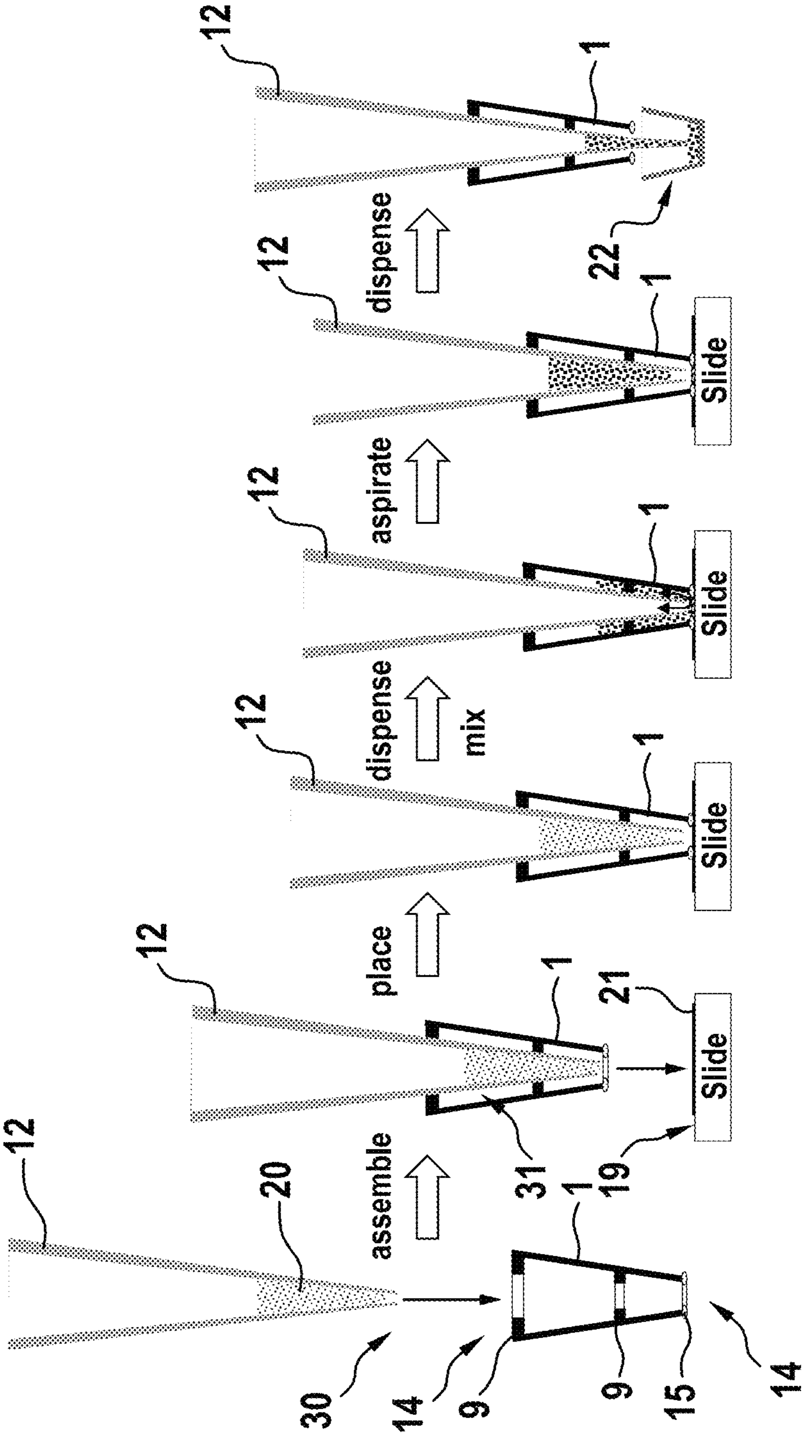

FIG. 15 shows in a highly schematically presentation sequence steps of an exemplary method. Shown is a pipette tip 12 which already comprises a liquid 20, and a pipette tip extension 1 which comprises distance elements 9. For attaching the pipette tip extension 1 to the pipette tip 12, the pipette tip 12 may be inserted into the pipette tip extension 1 through its reception aperture 8. For example, the pipette tip 12 may be mounted onto a pipette of an automated liquid handling workstation and may by automatically moved into the pipette tip extension 1. The direction of such a movement is indicated by an arrow, while a corresponding liquid handling workstation 25 is not indicated in this Figure. Assembling the pipette tip 12 with the pipette tip extension 1 may of course be carried out by moving the pipette tip extension 1 onto the distal end 30 of the pipette tip 12, or by a mutually move both, the pipette tip 12 and the pipette tip extension 1 to each other. The step of assembling is indicated by the block arrow.

For the pipette tip extension 1 two distance elements 9 are shown which are arranged at different heights. Upper distance elements 9 are arranged flush with the proximal end 2 of the pipette tip extension 1, and the lower distance elements 9 are arranged in the lower half of the pipette tip extension 1. The distance elements 9 are shown to be cut. Though it is not visible here, the distance elements 9 in any case do not extend circumferentially and close the proximal end 2, but they are configured to leave the proximal end 2 of the pipette tip extension essentially open towards the surrounding atmosphere.

The assembly comprising the pipette tip extension 1, the pipette tip 12, and the distance elements 9 is then be placed onto a sample. In this Figure, the sample is a sample section 21 immobilized on the upper surface 19 of a microscopic slide. The pipette tip extension 1 shown comprises at the distal end 3 a seal section 15, in this case a circumferential seal which may ensure that the distal end 3 of the pipette tip extension 1 is sealingly closed by a surface, for example of a sample/and or of a carrier surface for a sample. The nature of the seal section 15 may be adapted to the nature of the sample with which the pipette tip extension 1 is used. For example, if a block of a deep-frozen tissue sample shall be treated with the pipette tip extension 1, a different material may be used as if a cell culture on a petri dish or a bacterial colony on an agar plate shall be treated. The sealing effect may additionally or alternatively be controlled with the force by which the assembly of pipette tip extension 1, distance element 9 and pipette tip 12 is placed onto the sample and is hold thereon.

When the pipette tip extension 1 is placed with the other members of the assembly onto the sample, and a desired area of interest is positioned within the dispense aperture 14 of the pipette tip extension 1, sealingly enclosed by the seal section 15 and/or the distal end of the exterior wall 4, the liquid 20 is then dispensed out of the pipette tip 12 into the fluid uptake area 31 which is generated by the assembly. Thereby, a fluid flow is generated via the gap and the fluid uptake area 31 over the sample which is located within or below the dispense aperture 14. As the dispense opening 14 is closed by the sample 21 and/or the surface 19, it is essential that the pipette tip extension 1 remains open at the proximal end 2 also when a pipette tip 12 is inserted into the pipette tip extension 1, as this ensures that a pressure compensation is possible when the liquid 20 is dispensed out of the pipette tip 12 and the fluid flow may be generated over the sample 21. This may for example be achieved by the configuration of the distance element 9, as discussed before.

By a repeated movement of the liquid 20 between the pipette tip 12 and the fluid uptake area 31 of the pipette tip extension 1 (indicated by the bended double arrow), the fluid flow over the sample below the dispense aperture 14 of the pipette tip extension may arbitrarily be maintained. The repeated movement of the liquid by repeated dispensation and aspiration of the liquid of the pipette tip 12 is also designated here as mixing, as this type of moving a liquid is well suited effectively mix different components. In the present case, a mixing of liquids is not envisaged, although it is possible that a mixing effect may be achieved: by the maintenance of a continuous flow over the sample surface, the sample is continuously subjected to the influence of the liquid 20. By this, components of the sample may be isolated from the sample and be taken up by the liquid 20, this is indicated by the changed, slightly thicker hatching of the liquid. The effect may additionally be enhanced if a liquid 20 is used which promotes the isolation of tissue component(s). By the choice of the liquid 20 to be used, the desired effect of the liquid may be directed specifically onto the specific area of interest below/within the dispense aperture 14.

Liquids 20 which are particularly suitable are for example liquids for maintaining, cultivating, and/or storing a sample, such as buffer or cell culture solutions. Exemplarily mentioned are here as a buffer a HEPES-(Hydroxyethylpiperazin-Ethansulfonic acid) buffer, a natriumdihydrogenate-phosphate buffer, or a TRIS based (Tris(hydroxymethyl)-aminomethane) buffer. Suitable cell culture solutions may be for example for human and/or animal cell culture a Dulbecco's Modified Eagle's Medium (DMEM), or other liquids for culturing eukaryotic cells, or a culture medium for culturing microorganisms, such as a lysogeny broth (LB-medium) for culturing bacterial cells.

Other suitable liquids 20 are for example reagents for treating the sample. The treatment may for example be a cell lysis reaction, a staining reaction, a binding reaction, and/or the removal/dissolving of an embedding medium or parts thereof for its removal, for example a deparaffination step of frozen and formalin fixed paraffin embedded tissue sections, or extraction reactions for example for extracting proteins or nucleic acids from a corresponding electrophoresis gel.

Instead or in addition to the mixing type movement of the liquid, a soaking step is also possible (not shown here). In such a soaking step, the complete volume or only a part of the liquid volume is dispensed from the pipette tip 12 onto the sample to completely cover or moisten the sample below, or in the dispense aperture 14, respectively. The liquid 20 may be left there for example for incubation purposes, and after a certain time period, the liquid may be aspirated again into the pipette tip 12 or may be moved into the fluid uptake area 31, for example for a further subsequent mixing step.

After applying the liquid flow to the area of the sample below or within the dispense aperture 14, the liquid may then be aspirated back into the pipette tip 12 for subsequent method steps. Such subsequent steps may be for example the transfer of the liquid 20 into another container 20 or tube, as it is shown as the last step in FIG. 15. It is possible to keep the pipette tip extension 1 at the distal end 30 of the pipette tip 12, as it is also shown in FIG. 15, or to remove the pipette tip extension 1 beforehand, for example manually or automatically by an ejection system of a liquid handling workstation 25.

Additionally, or alternatively, depending on the desired processing of the liquid and the components from the sample, the assembly may for example be placed onto another area of the same sample.

Figure 16:
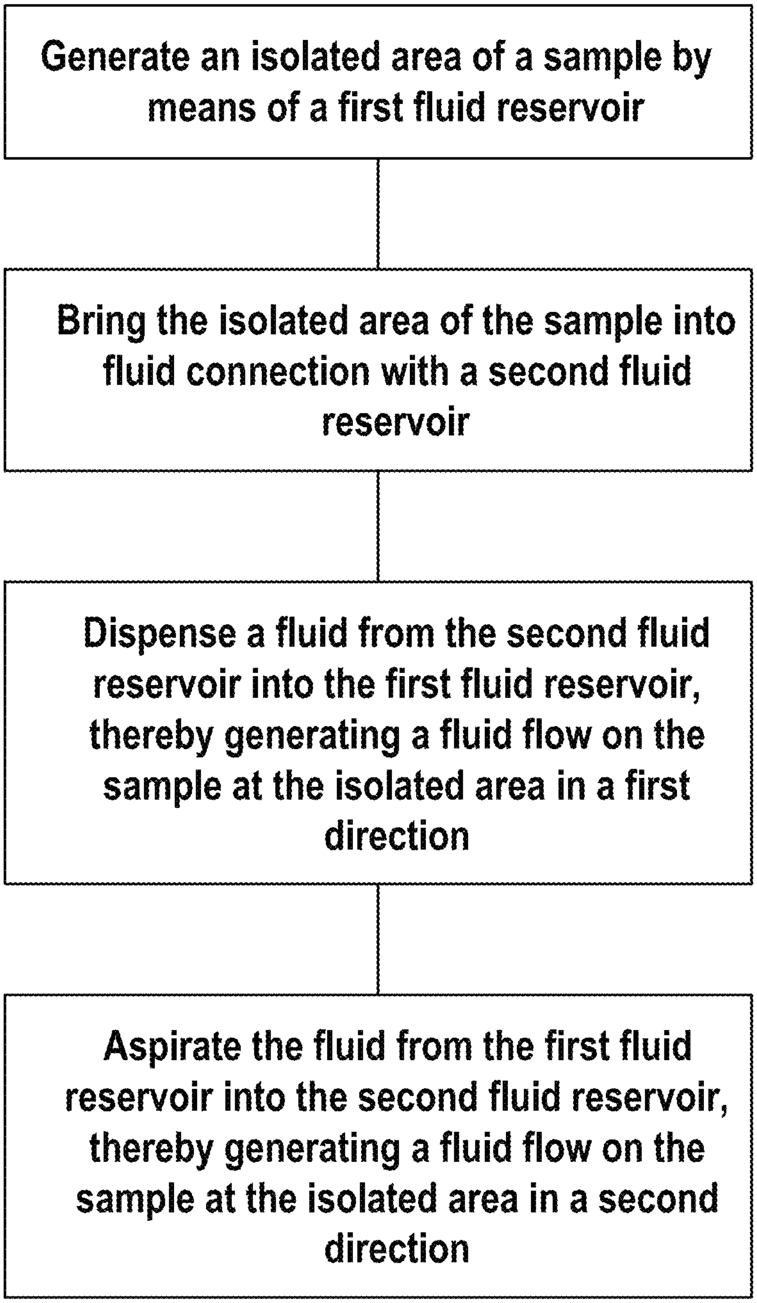

FIG. 16 shows in a schematic diagram a flow chart of an example of a method for treating a sample. The method may comprise the following steps:

- Generating an isolated area of a sample by means of a first fluid reservoir. The first fluid reservoir encloses a distal end of a second fluid reservoir. The isolated area of the sample is sealed towards the remaining area of the sample by the first fluid reservoir, for example by the distal end of the first fluid reservoir.
- Bringing the isolated area of the sample into fluid connection with a second fluid reservoir.
- Dispensing a fluid from the second fluid reservoir into the first fluid reservoir, thereby generating a fluid flow on the sample at the isolated area in a first direction.
- Aspirate the fluid from the first fluid reservoir into the second fluid reservoir, thereby generating a fluid flow on the sample at the isolated area in a second direction.

By the application of a bidirectional fluid flow, the influence of a fluid, for example of a liquid may be increased. This is for example an advantage when components of a sample or the sample itself shall be collected by a restricted volume of liquid. For example, when a nucleic acid of a tissue sample shall be extracted from said tissue sample, it is often a problem that the nucleic acid is available only in minor amounts, and typically, an enrichment step is required, for example a precipitation step, to have the nucleic acid available in a reasonable concentration. In particular by a repeated application of the bidirectional fluid flow, the amount of components collected by the liquid may significantly be increased without the need to increase for example the volume of liquid 20 to be used for the isolation of the components.

Figure 17:
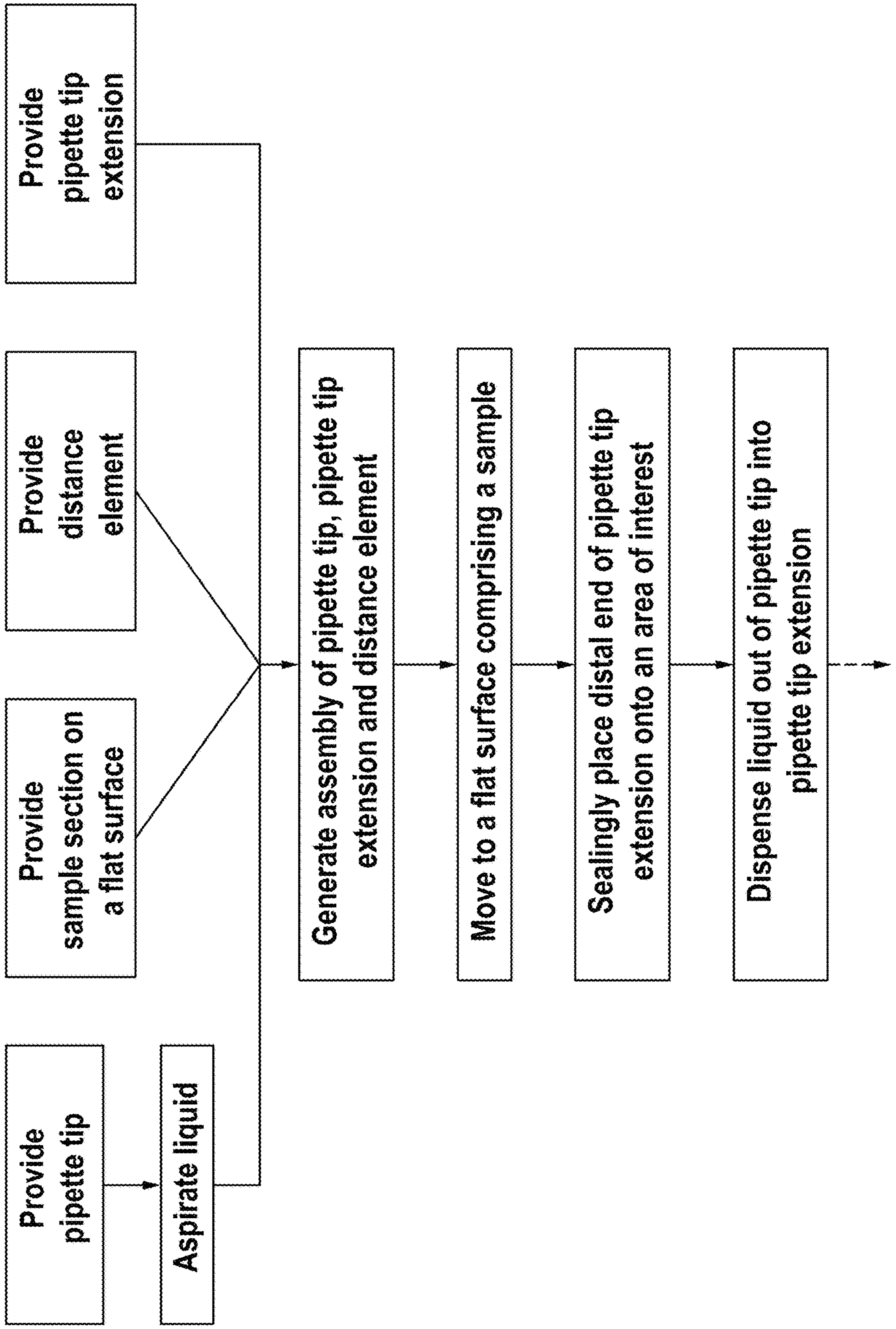

FIG. 17 shows in a schematic diagram a flowchart of further specified method steps for treating a sample. The method described herein is particularly directed for treating a sample section 21, which is for example immobilized on a surface 19, such as the flat surface of a microscope slide. For allowing the generation of an isolated area of the sample by means of a first fluid reservoir, which is in fluid connection with the second reservoir, a pipette tip 12 may be provided additionally, as well as a pipette tip extension 1 and at least one distance element 9.

The pipette tip 12, the pipette tip extension 1 and at least one distance element 9 are assembled to for a functional unit which is suitable for carrying out the method. Optionally, one or more constriction elements 13 may be provided. The configuration of each of the elements of the assembly may be chosen according to the previous descriptions, and the different elements may be freely configured and combined to any combination as needed.

A liquid 20 is aspirated by the pipette tip, preferably using an automated liquid handling workstation 25. The liquid 20 may be aspirated before assembling the distinct elements; however it is also possible to aspirate the liquid 20 when the assembly has already been formed (not shown).

The assembly is moved to the sample, in the method described herein to a sample section 21 on a microscope slide. The assembly is then placed onto the sample section 21 or the microscope slide, respectively, at a desired area of interest. When the distal end 3 of the pipette tip extension 1 touches the surface, in this case, or has penetrated the sample by a certain depth, a sealing effect is established by the distal end of the pipette tip extension, and the area of interest or a part thereof is isolated from the surrounding sample. Furthermore, the now isolated area is in fluid connection with the pipette tip 12, specifically with the inner cavity of the pipette tip 12. By dispensing liquid 20 from the pipette tip 12, the liquid 20 is moved via the isolated area of the sample into the pipette tip extension 1. The isolated area of the sample is hereby exposed to the liquid 20, and the liquid 20 is collected after the exposure in the pipette tip extension 1 for further steps.

Figure 18:
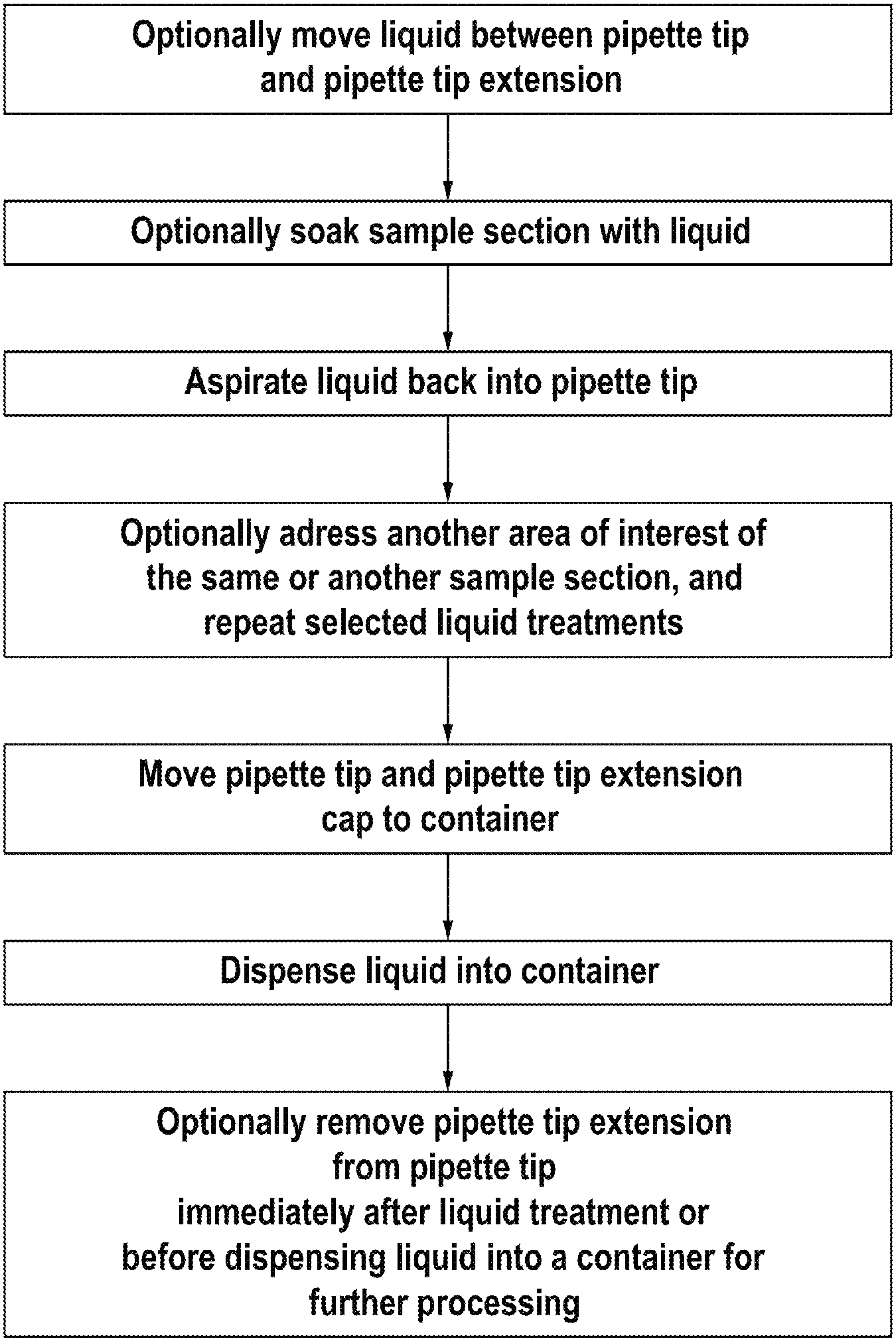

FIG. 18 shows in a schematic diagram a flowchart of further specified, additional and optional method steps. Optionally, for example, the liquid 20 may repeatedly be moved between the pipette tip 12 and the pipette tip extension 1, by a so called mixing movement 8 (a repeated aspiration and dispense step). The sample is hereby repeatedly exposed to the same liquid, which allows for example the enrichment of components of the sample within the liquid. Also optionally is a soaking step, which is the exposure of the liquid 20 to the sample without the liquid 20 being moved. After having the isolated sample area exposed by a desired time and/or fluid flow of the liquid 20, the liquid is then aspirated back into the pipette tip 12. Having the liquid back in the pipette tip 12, further processing steps may be carried out. For example, another sample area or another sample or area of interest, respectively, by be addressed with the same liquid, by sealingly place the distal end 3 of the pipette tip extension 1 onto the other area, and repeating one or more steps described above. By this, the liquid 20 may be enriched by additional sample components.

However, the assembly comprising still the liquid 20 may also be moved to a laboratory container 22, such as a vessel or tube, and the liquid 20 being dispensed into that container. In an optional step, the pipette tip extension may be removed from the pipette tip immediately after the treatment of the sample and before aspirating the liquid 20 into the container 22, or the pipette tip extension 1, distance elements 9 and pipette tip 12 remain assembled at least until the liquid 20 is dispensed into the container 22.

Concerning the method as described by example by the FIGS. 15 to 18, the method steps may be carried out in another sequence where reasonable and desirable. Additional, optional steps may be possible. For carrying out the method steps, the pipette tip 12 is mounted on a pipette, for example on a manual pipettor or on a pipette of an automated liquid handling workstation 25 as mentioned before.

| REFERENCE SIGNS LIST | |
|---|---|
| 1 | pipette tip extension |
| 1.1 | first part of pipette tip extension |
| 1.2 | second part of pipette tip extension |
| 2 | proximal end of pipette tip extension |
| 3 | distal end of pipette tip extension |
| 4 | exterior wall of pipette tip extension |
| 5 | outer side of the exterior wall |
| 6 | inner side of the exterior wall |
| 7 | inner cavity of pipette tip extension |
| 8 | reception aperture of pipette tip extension |
| 9 | distance element |
| 10 | stop surface of distance element |
| 11 | medial axis of pipette tip extension |
| 12 | pipette tip |
| 13 | constriction element |
| 14 | dispense aperture of pipette tip extension |
| 15 | seal section |
| 16 | support bar |
| 17 | insert |
| 18 | carrier |
| 19 | surface |
| 20 | liquid |
| 21 | sample section |
| 22 | pipette |
| 23 | stopper of the carrier |
| 24 | accommodation site of the carrier |
| 25 | liquid handling workstation |
| 26 | controller of the liquid handling workstation |
| 27 | pipetting head of liquid handling workstation |
| 28 | exterior wall of the pipette tip |
| 29 | proximal end of the pipette tip |
| 30 | distal end of the pipette tip |
| 31 | fluid uptake area |
| 32 | pipette tip hosting area |
| 33 | proximal aperture of pipette tip |
| 34 | distal aperture of pipette tip |
| 35 | proximal section of pipette tip |
| 36 | intermediate section of pipette tip |
| 37 | distal section of pipette tip |
| h | gap height |

-continued

| REFERENCE SIGNS LIST | |
|---|---|
| $l_1$ | lateral extension of inner cavity of pipette tip extension |
| $l_2$ | lateral extension of dispense aperture |
| a | width of distance element |
| b | length of distance element |
| c | depth of distance element |

The invention claimed is:

1. A pipette tip extension attachable to a pipette tip inserted thereto, comprising a proximal end, a distal end, and an exterior wall extending between the proximal end and the distal end, the exterior wall having an outer side and an inner side and enclosing an inner cavity which is delimited by the inner side of the exterior wall, wherein the exterior wall forms at the proximal end, a reception aperture for inserting a pipette tip, and at the distal end a dispense aperture, wherein the pipette tip extension further comprises:

one or more distance elements arranged at the inner side of the exterior wall and protruding into the inner cavity, the distance elements being dimensioned to establish a fluid uptake area adjacent to the inner side of the exterior wall, the fluid uptake area extending from the dispense aperture up to the reception aperture and being in fluid connection with a surrounding atmosphere at the reception aperture, and a constriction element for controlling an insertion depth of the inserted pipette tip within the pipette tip extension, the constriction element defining a fixed gap from a distal end of the inserted pipette tip to the distal end of the pipette tip extension, wherein the fixed gap has a height in a range of 0.1 mm and 1 mm and fluidly connects the fluid uptake area adjacent to the inner side of the exterior wall with an inner cavity of the inserted pipette tip, the constriction element being separate from the one or more distance elements; and wherein the pipette tip extension is configured to transfer a fluid from the inner cavity into the inserted pipette tip.

2. The pipette tip extension according to claim 1, wherein of the one or more distal elements one or more are arranged flush with respect to the proximal end of the pipette tip extension, and/or one or more are arranged offset with respect to the proximal end of the pipette tip extension.

3. The pipette tip extension according to claim 1, wherein the one or more distance elements comprising at least two distance elements.

4. The pipette tip extension according to claim 1, wherein at least one distance element is configured as an elongated bar which extends along a direction from the proximal end towards the distal end of the pipette tip extension.

5. The pipette tip extension according to claim 1, wherein the exterior wall has a shape which is adapted to an outer shape of a pipette tip to which the pipette tip extension shall be attached.

6. The pipette tip extension according to claim 1, wherein the exterior wall is a circumferential wall which tapers towards the lower end of the pipette tip extension.

7. The pipette tip extension according to claim 1, comprising two pipette tip hosting areas for receiving two pipette tips.

8. The pipette tip extension according to claim 1, wherein the one or more distance elements comprise at least three distance elements.

9. The pipette tip extension according to claim 1, wherein each distance element is configured as an elongated bar which extends along a direction from the proximal end towards the distal end of the pipette tip extension.

10. The pipette tip extension according to claim 1, wherein the constriction element is formed by an annular ring forming a stop surface, the annular ring forming an inner aperture and having support bars extending laterally therefrom to couple an outer portion of the annular ring to the inner side of the exterior wall, with circumferential spacing between each support bar so that the constriction element forms a sieve-like arrangement so the fluid from the pipette tip flows to the dispense aperture via the sieve-like arrangement.

11. The pipette tip extension according to claim 1, wherein the distance elements comprise a stop surface which is directed towards a medial axis of the pipette tip extension, and which can be abutted by a pipette tip when the pipette tip extension is attached to the pipette tip.

12. The pipette tip extension according to claim 11, wherein the stop surface of each distance element is essentially parallel to the inner side of the exterior wall.

13. The pipette tip extension according to claim 1, wherein the exterior wall comprises at the distal end a seal for sealing the dispense aperture when the pipette tip extension is placed with the distal end onto a surface.

14. The pipette tip extension according to claim 13, wherein the seal is provided—by the distal end of the pipette tip extension, or—by a separate seal material at the distal end of the pipette tip extension.

15. The pipette tip extension according to claim 14, wherein the seal is provided by a separate material at the distal end of the pipette tip extension, which is over-molded or which is provided as an attachable seal.

16. The pipette tip extension according to claim 15, being configured as a two-part piece, wherein the two-part piece comprises:

an upper, first part providing the reception aperture, and a lower, second part providing the dispense aperture, wherein the first part and the second part may be plugged together to form the pipette tip extension, and wherein the second part is made of a seal material.

17. The pipette tip extension according to claim 16, wherein the first part further comprises the one or more distance elements, and wherein the second part further comprises a constriction element for controlling an insertion depth of a pipette tip.

* * * * *